(12) United States Patent
Owensby et al.

(10) Patent No.: US 8,807,834 B2
(45) Date of Patent: Aug. 19, 2014

(54) EASY OPEN AND RECLOSABLE PACKAGE WITH PANEL SECTION WITH EASY OPEN SEALANT, AND RECLOSURE MECHANISM

(75) Inventors: Joseph E. Owensby, Spartanburg, SC (US); Howard Dean Conner, Mauldin, SC (US); Billy W. Austin, Duncan, SC (US); Hubert J. Cook, Simpsonville, SC (US); Andrew W. Moehlenbrock, Simpsonville, SC (US)

(73) Assignee: Cryovac, Inc., Duncan, SC (US)

( * ) Notice: Subject to any disclaimer, the term of this patent is extended or adjusted under 35 U.S.C. 154(b) by 326 days.

(21) Appl. No.: 13/438,494

(22) Filed: Apr. 3, 2012

(65) Prior Publication Data
US 2013/0209005 A1    Aug. 15, 2013

Related U.S. Application Data

(60) Provisional application No. 61/598,025, filed on Feb. 13, 2012.

(51) Int. Cl.
*B65D 33/00* (2006.01)
*B65D 33/16* (2006.01)
*B65D 33/24* (2006.01)
*B65B 3/02* (2006.01)
*B65D 43/04* (2006.01)

(52) U.S. Cl.
USPC .............. 383/210.1; 383/62; 383/66; 383/86; 383/95; 383/204; 53/452; 53/455

(58) Field of Classification Search
CPC .... B65D 2313/02; B65D 33/20; B65D 33/24; B65D 33/2541; A44B 19/16
USPC ............ 383/66, 203, 204, 62, 85, 86, 88, 93, 383/95, 210.1; 53/450, 451, 452, 455, 545, 53/550, 551, 552, 562
See application file for complete search history.

(56) References Cited

U.S. PATENT DOCUMENTS

| 3,655,118 A | 4/1972 | Rinecker |
| 3,727,829 A * | 4/1973 | Huni .............................. 383/203 |

(Continued)

FOREIGN PATENT DOCUMENTS

| EP | 1304213 A1 | 4/2003 |
| EP | 1468931 A1 | 10/2004 |

(Continued)

OTHER PUBLICATIONS

APLIX Packaging, Oct. 11, 2011, 3 pages.

*Primary Examiner* — Jes F Pascua
(74) *Attorney, Agent, or Firm* — Mark B. Quatt

(57) ABSTRACT

An easy-open and reclosable package includes a pouch including a reclosure mechanism including a first and second interlocking strip each having an interlocking segment having a base surface and an interlocking surface; a panel section so arranged that when the panel section is displaced, and the package is opened, a product can be accessed between the first and second interlocking strips, the first and second interlocking surfaces are at least partially exposed, and the package can thereafter be reclosed by folding the package such that the interlocking surface of the first interlocking strip is interlocked with the interlocking surface of the second interlocking strip. The first and second strips are not exposed until the package is initially opened, and are not interlocked with one another until the package is initially opened and then reclosed.

21 Claims, 25 Drawing Sheets

(56) References Cited

U.S. PATENT DOCUMENTS

| | | | |
|---|---|---|---|
| 4,335,817 A | 6/1982 | Bahr | |
| 4,709,399 A | 11/1987 | Sanders | |
| 4,785,940 A | 11/1988 | Wilson | |
| 4,902,142 A | 2/1990 | Lammert et al. | |
| 4,946,289 A | 8/1990 | Bolling et al. | |
| 5,113,555 A * | 5/1992 | Wilson et al. | 24/584.1 |
| 5,461,845 A | 10/1995 | Yeager | |
| 5,806,984 A | 9/1998 | Yeager | |
| 5,954,433 A | 9/1999 | Yeager | |
| 6,402,376 B1 * | 6/2002 | Bois | 383/64 |
| 6,662,843 B1 | 12/2003 | Johnson | |
| 6,692,149 B2 * | 2/2004 | Baker et al. | 383/204 |
| 6,991,375 B2 | 1/2006 | Clune et al. | |
| 2003/0118254 A1 * | 6/2003 | Razeti et al. | 383/204 |
| 2004/0001927 A1 | 1/2004 | Moran et al. | |
| 2004/0013322 A1 | 1/2004 | Taylor | |
| 2006/0062496 A1 | 3/2006 | Clune et al. | |
| 2007/0140599 A1 | 6/2007 | Dalgleish et al. | |
| 2008/0041022 A1 | 2/2008 | Shepard et al. | |
| 2008/0056622 A1 | 3/2008 | Austreng et al. | |
| 2009/0152139 A1 | 6/2009 | Roesink et al. | |
| 2010/0021093 A1 * | 1/2010 | Plourde et al. | 383/204 |
| 2010/0290719 A1 | 11/2010 | Yeager | |
| 2011/0036741 A1 | 2/2011 | Moehlenbrock et al. | |
| 2011/0038569 A1 * | 2/2011 | Huffer et al. | 383/207 |
| 2011/0038570 A1 | 2/2011 | Moehlenbrock et al. | |
| 2011/0038571 A1 | 2/2011 | Moehlenbrock et al. | |
| 2011/0097019 A1 | 4/2011 | Moehlenbrock et al. | |
| 2011/0097024 A1 | 4/2011 | Moehlenbrock et al. | |
| 2011/0249919 A1 | 10/2011 | Shepard | |
| 2012/0006822 A1 | 1/2012 | Yeager | |
| 2012/0052161 A1 | 3/2012 | Woodham | |
| 2012/0207410 A1 | 8/2012 | Moehlenbrock et al. | |
| 2012/0224795 A1 | 9/2012 | Moehlenbrock et al. | |

FOREIGN PATENT DOCUMENTS

| | | | |
|---|---|---|---|
| WO | WO 8702646 A1 * | 5/1987 | B65D 33/22 |
| WO | WO2011001223 | 1/2011 | |

* cited by examiner

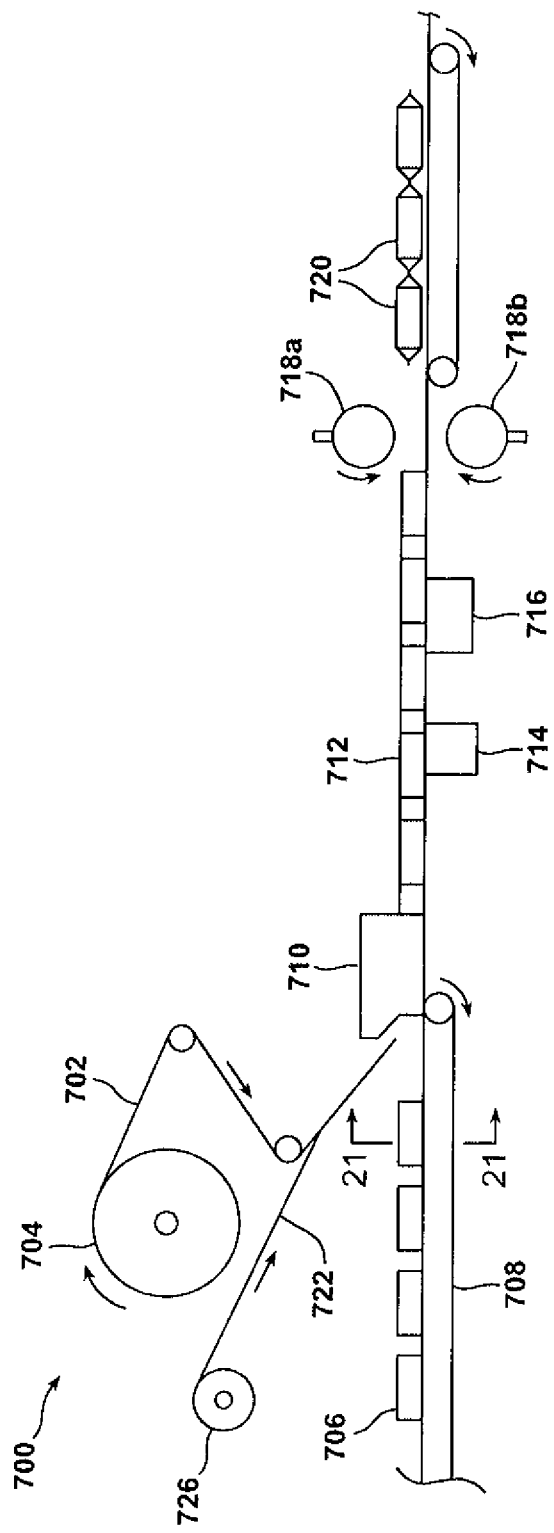

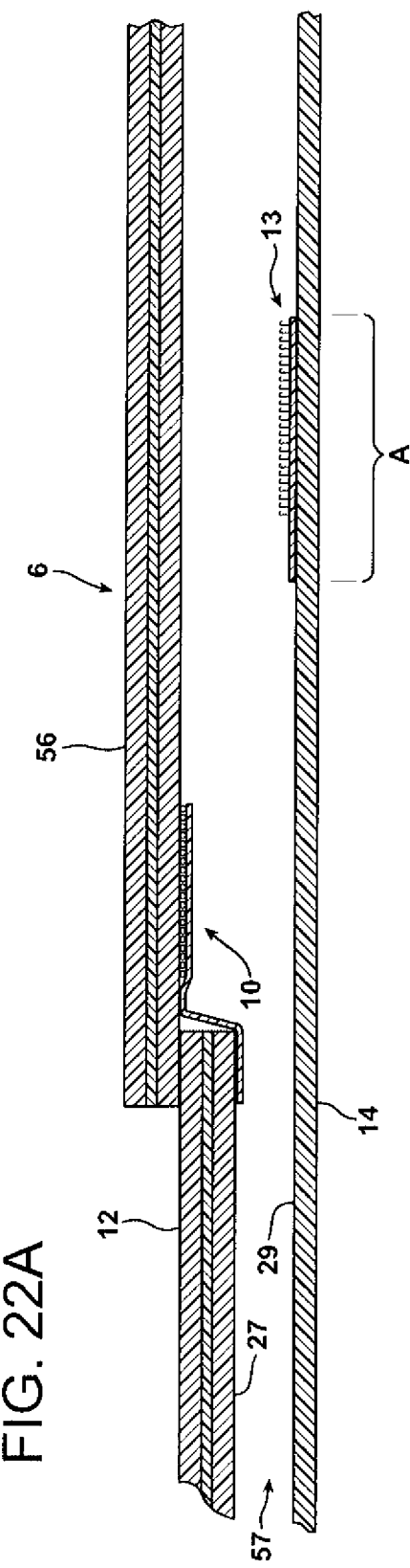
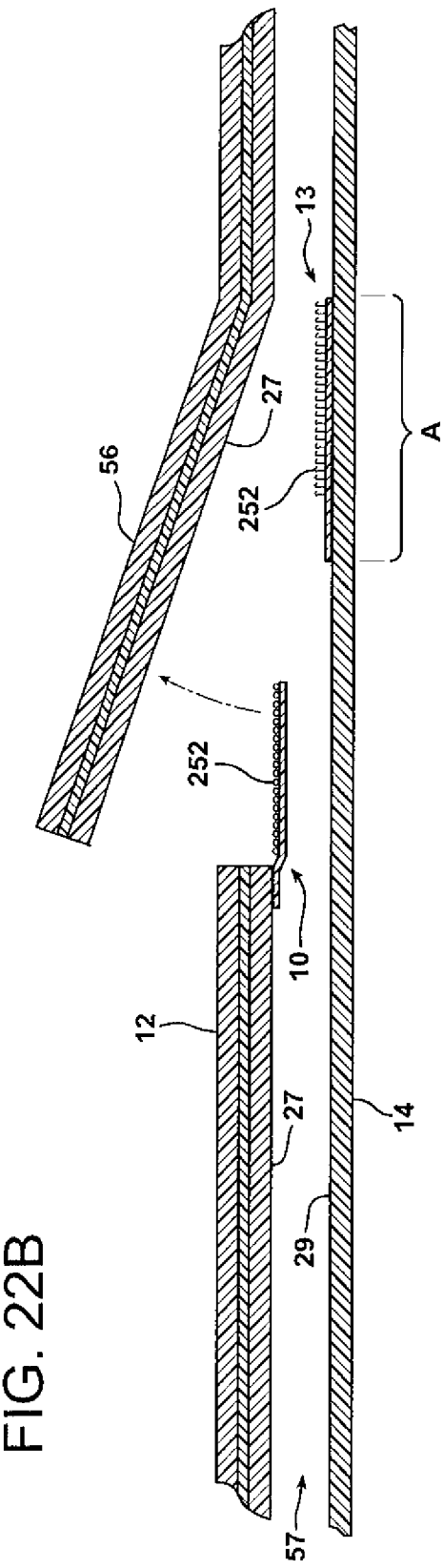

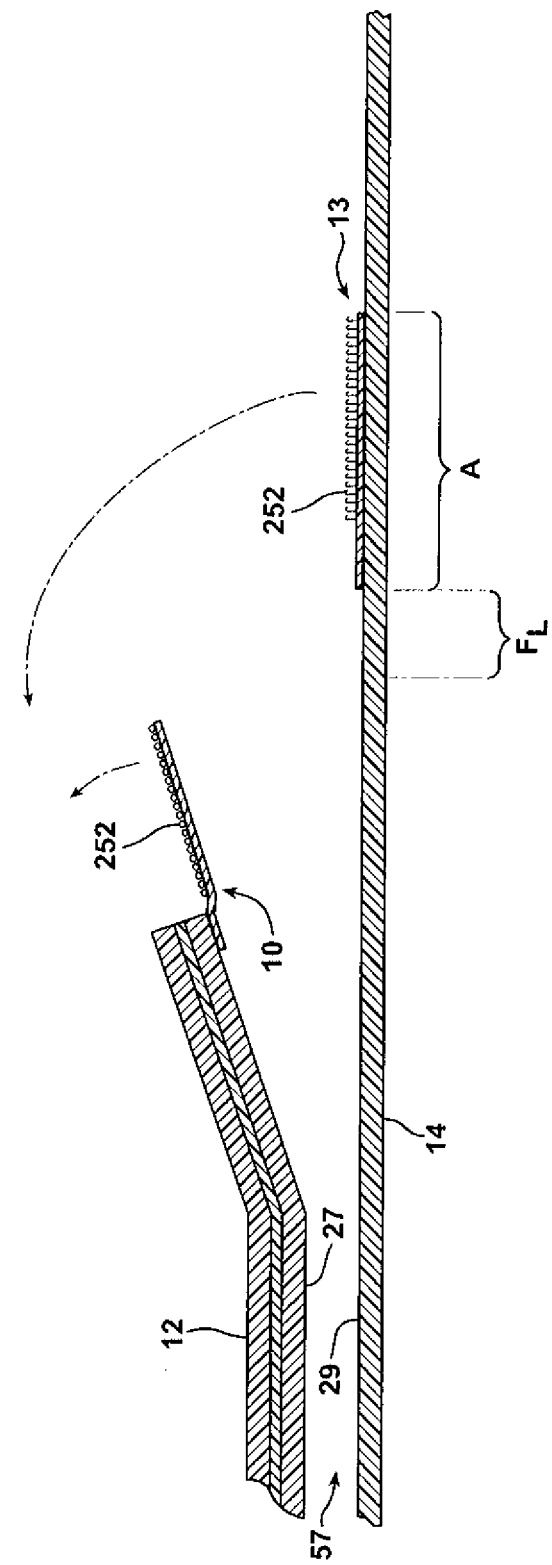

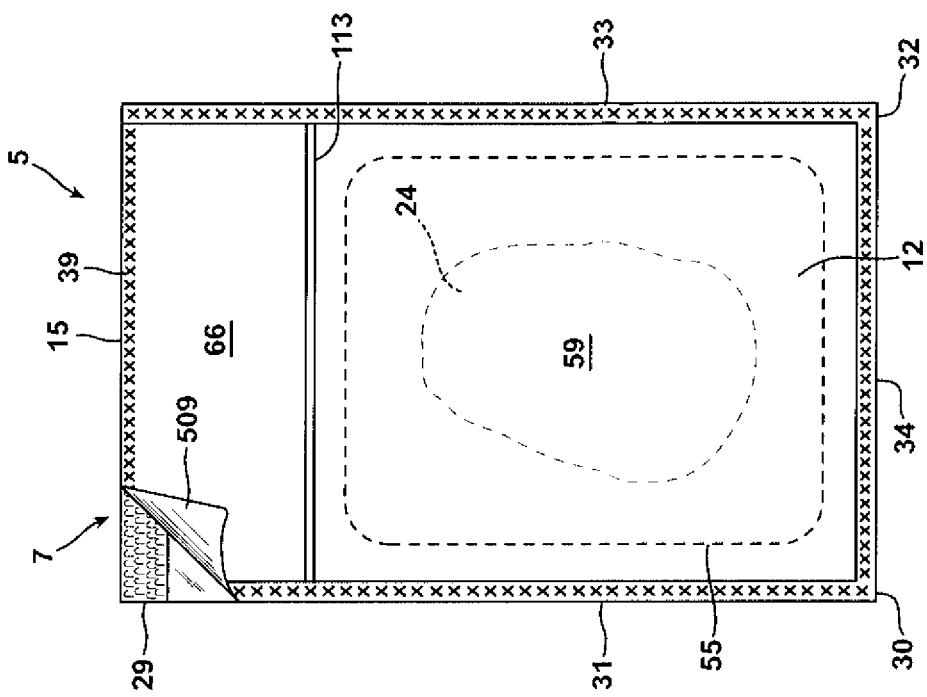
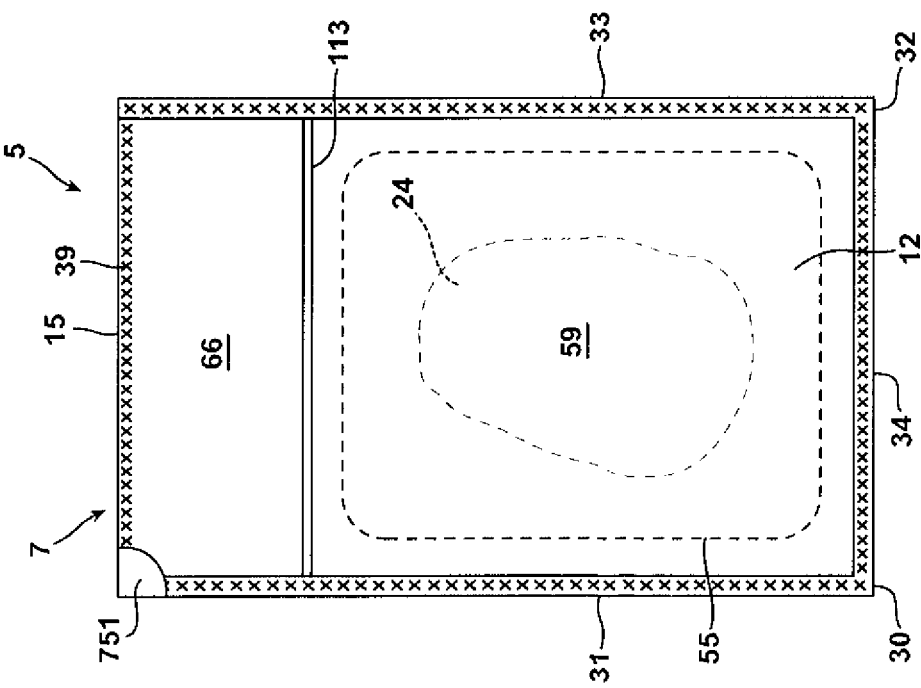

EASY OPEN AND RECLOSABLE PACKAGE WITH PANEL SECTION WITH EASY OPEN SEALANT, AND RECLOSURE MECHANISM

This application claims the benefit of U.S. Provisional Application No. 61/598,025, filed Feb. 13, 2012, that application incorporated herein by reference in its entirety.

FIELD OF THE INVENTION

This invention relates to an easy-open and reclosable package with a panel section with an easy-open sealant, and a reclosure mechanism, and to methods of making the package.

BACKGROUND OF THE INVENTION

Food and non-food products, including produce, snack foods, cheese and the like have long been packaged in containers such as pouches, bags, or lidded trays or formed webs made from various thermoplastic materials such as polyethylene, polypropylene, or polyester (PET). These containers can be formed from a web or webs of thermoplastic material on packaging equipment, using various packaging processes, at a processing/packaging facility. Such equipment and processes includes horizontal form/fill/seal (HFFS), vertical form/fill/seal (VFFS), thermoforming/lidstock, and continuous horizontal packaging (sometimes referred to as Flowwrap). In each case, the product is manually or automatically placed in a pouch, bag, formed web, tray, etc., the filled container is optionally vacuumized or gas flushed, and the mouth of the container is hermetically or non-hermetically sealed to close and finish the package.

Opening of the finished package (i.e. opening with the use of tools such as scissors or knives) can provide access to the product by the consumer.

Common in the industry is the use of pressure sensitive adhesive to provide a reclosability feature to a package. However, based on the position of the adhesive relative to the package, the adhesive can sometimes be contaminated by the contained product before the package is opened, or once the package is opened, when product is removed from the package and comes in contact with the adhesive. This phenomenon can compromise the reclosability of the package. Also, the performance of the adhesive can sometimes be compromised at refrigerated conditions, or in the presence of grease or moisture caused by the packaging of greasy or wet foods.

Also common in the industry is the use of plastic zipper closures; press-to-close or slide zippers, interlocking closures; reclosable fasteners with interlockable fastener elements; and interlocking rib and groove elements having male and female profiles; interlocking alternating hook-shaped closure members, and hook and loop fasteners; fasteners employing self-engageable male fastener elements; fasteners utilizing interference fit, and the like. These features provide reclosability, and in some cases may provide an easy-open feature to the package.

There is need in the marketplace for a package, and methods of packaging involving e.g. an HFFS, VFFS, thermoforming/lidstock, or continuous horizontal packaging process, that can be used in a manner that requires little or no modification to the packager's packaging equipment, while providing a manually (i.e. by hand, without the need for tools such as scissors or knives) openable and easy to reclose feature, optionally while maintaining hermeticity of the package when made, and optionally without the use of pressure sensitive adhesive and the like.

There is also a need in the marketplace for an assembly that can be anchored to a processor's packaging material or web of choice to provide easy-open and reclosable functionalities to a package made from that web/assembly combination with only relatively minor modifications to the processor's packaging material, packaging process or equipment.

The present invention relates to a package, and methods of making the package, which package is manually openable and reclosable, i.e. can be opened and reclosed a number of times, and adapted to package non-food products; food products such as e.g. produce, snack foods, cheese, luncheon meat, sausage, culinary nuts, trail mix, etc; medical or pharmaceutical products; or other items that benefit from being packaged in an easyopen/reclosable package. The package optionally maintains a hermetic seal until the package is opened.

SUMMARY OF THE INVENTION

Statement of Invention/Embodiments of the Invention

In a first aspect, an easy-open and reclosable package comprises:
a) a pouch comprising
  i) a first and second side panel each comprising an outer and inner surface, a first and second side edge, and a first and second end, the first and second side panels joined together along their respective first and second side edges;
  ii) a first end;
  iii) a second end defined by the second end of the first and second side panels respectively;
  iv) a panel section comprising an outer and inner surface, a first and second side edge, and a first and second end, the inner surface comprising an easy-open sealant, wherein the first end of the panel section is joined to the second side panel with an easy-open seal,
    the panel section and the second side panel are joined together along their respective first and second side edges with an easy-open seal, and the panel section is anchored to the first side panel;
  v) a reclosure mechanism, disposed between the panel section and the second side panel, comprising
    (a) a first interlocking strip comprising a first and second side edge, a first and second end, and an interlocking segment having a base surface and an interlocking surface, the first interlocking strip anchored to at least one of the panel section and first side panel such that the interlocking surface faces the inner surface of the panel section, and
    (b) a second interlocking strip comprising a first and second side edge, a first and second end, and an interlocking segment having a base surface and an interlocking surface, the second interlocking strip anchored to the inner surface of the second side panel such that the interlocking surface faces the inner surface of the panel section; and
  wherein when the panel section is displaced, and the package is opened,
    (a) the product can be accessed between the first and second interlocking strips,
    (b) the interlocking surface of each of the first and second interlocking strips is at least partially exposed, and
    (c) the package can thereafter be reclosed by folding the package such that the interlocking surface of the first interlocking strip is interlocked with the interlocking surface of the second interlocking strip; and
b) a product disposed in the pouch;
wherein the package is configured such that
(i) the interlocking surfaces of the first and second interlocking strips are not exposed until the package is initially opened,
(ii) the interlocking surfaces of the first and second interlocking strips are not interlocked with one another until the package is initially opened and then reclosed, and
(iii) the interlocking surface of the first interlocking strip is farther from the first end of the package than the interlocking surface of the second interlocking strip.

In a second aspect, a method of making an easy-open and reclosable package in a horizontal form/fill/seal process comprises:
a) providing a lay-flat web comprising a first and second surface;
b) providing a reclosure mechanism comprising a first and second interlocking strip each comprising a first and second side edge, a first and second end, and an interlocking segment having a base surface and an interlocking surface;
c) providing a panel section comprising an outer and inner surface, a first and second side edge, and a first and second end, the inner surface comprising an easy-open sealant;
d) advancing the lay-flat web to a forming device to convert the lay-flat web to a folded web having an interior surface;
e) advancing the reclosure mechanism and panel section such that when the package is made, the reclosure mechanism and panel section are part of the package;
f) making side seals in the folded web and the panel section to produce an open pouch comprising
  i) the first and second side panels each comprising an outer and inner surface, a first and second side edge, and a first and second end, the first and second side panels joined together along their respective first and second side edges by a seal,
  ii) a first end defined by the first end of at least one of the panel section and second side panel,
  iii) a second end defined by the second end of the first and second side panels respectively, the first and second side panels joined together along their respective second ends,
  iv) the panel section and second side panel joined along their respective first and second side edges with an easy-open seal, and
  v) positioning the first and second interlocking strips such that the interlocking surfaces of the first and second interlocking strips face the inner surface of the panel section;
g) putting a product in the open pouch; and
h) sealing the first end of the panel section to the second side panel to close the pouch;
wherein the package is configured such that
(i) when the panel section is displaced, and the package is opened,
  (a) the product can be accessed between the first and second interlocking strips,
  (b) the interlocking surface of each of the first and second interlocking strips is at least partially exposed, and
  (c) the package can thereafter be reclosed by folding the package such that the interlocking surface of the first interlocking strip is interlocked with the interlocking surface of the second interlocking strip;
(ii) the interlocking surfaces of the first and second interlocking strips are not exposed until the package is initially opened;
(iii) the interlocking surfaces of the first and second interlocking strips are not interlocked with one another until the package is initially opened and then reclosed;
(iv) the interlocking surface of the first interlocking strip is farther from the first end of the package than the interlocking surface of the second interlocking strip;
(v) each of the first and second interlocking strips is either pre-anchored to the lay-flat web or panel section, or is anchored to the lay-flat web, folded web, first or second side panel, or panel section at any time before or during the method of making the package; and
(vi) the web is cut at the side seals during the step of making side seals in the folded web, or before, during or after any subsequent steps.

In a third aspect, a method of making an easy-open and reclosable package in a vertical form/fill/seal process comprises:
a) providing a lay-flat web comprising a first and second surface;
b) providing a reclosure mechanism comprising a first and second interlocking strip each comprising a first and second side edge, a first and second end, and an interlocking segment having a base surface and an interlocking surface;
c) providing a panel section comprising an outer and inner surface, a first and second side edge, and a first and second end, the inner surface comprising an easy-open sealant;
d) advancing the lay-flat web over a forming device to convert the lay-flat web to a folded web having an interior surface;
e) advancing the reclosure mechanism and panel section such that when the package is made, the reclosure mechanism and panel section are part of the package;
f) longitudinally sealing the folded web and panel section to make a longitudinal seal;
g) transversely sealing the folded web and panel section to produce a first transverse seal to define a first pouch, wherein the first transverse seal is a bottom transverse seal of the first pouch;
h) putting a product in the first pouch;
i) advancing the folded web and panel section, with the first pouch, downward a predetermined distance;
j) transversely sealing the first pouch to produce a top transverse seal in the first pouch, and a bottom transverse seal in a second pouch, the second pouch disposed above the first pouch; and
k) transversely cutting the folded web and panel section to separate the first pouch from the second pouch to make a package, the package comprising
  the first and second side panels each comprising an outer and inner surface, a first and second side edge, and a first and second end, the first and second side panels joined together along their respective first and second side edges,
  a first end defined by the first end of at least one of the panel section and second side panel,
  a second end defined by the second end of the first and second side panels respectively,
  the panel section and second side panel joined along their respective first and second side edges by an easy-open seal, the first end of the panel section joined to the second side panel with an easy-open seal, and
  the first interlocking strip anchored to at least one of the panel section and first side panel such that the interlocking surface of the first interlocking strip faces the inner surface of the panel section, and the second interlocking strip anchored to the inner surface of the second side panel such that the interlocking surface of the second interlocking strip faces the inner surface of the panel section;

wherein the package is configured such that (i) when the panel section is displaced, and the package is opened,
 (a) the product can be accessed between the first and second interlocking strips,
 (b) the interlocking surface of each of the first and second interlocking strips is at least partially exposed, and
 (c) the package can thereafter be reclosed by folding the package such that the interlocking surface of the first interlocking strip is interlocked with the interlocking surface of the second interlocking strip;
(ii) the interlocking surfaces of the first and second interlocking strips are not exposed until the package is initially opened;
(iii) the interlocking surfaces of the first and second interlocking strips are not interlocked with one another until the package is initially opened and then reclosed;
(iv) the interlocking surface of the first interlocking strip is farther from the first end of the package than the interlocking surface of the second interlocking strip; and
(v) each of the first and second interlocking strips is either pre-anchored to the lay-flat web or panel section, or is anchored to the lay-flat web, folded web, first or second side panel, or panel section at any time before or during the step of making the package.

In a fourth aspect, a method of making an easy-open and reclosable package having a formed web comprises:
a) providing a formed web comprising a first and second end, and a product cavity;
b) providing a product;
c) providing a lidstock, having a first and second end, comprising
  a lay-flat web comprising an outer and inner surface,
  a panel section comprising an outer and inner surface, a first and second side edge, and a first and second end, the inner surface comprising an easy-open sealant;
d) providing a reclosure mechanism comprising a first and second interlocking strip each comprising a first and second side edge, a first and second end, and an interlocking segment having a base surface and an interlocking surface;
e) placing the product in the product cavity;
f) sealing the inner surface of the lidstock to the formed web, such that the reclosure mechanism is disposed between the lidstock and the formed web, the first interlocking strip anchored to the inner surface of the lidstock such that the interlocking surface of the first interlocking strip faces the inner surface of the lidstock, and the second interlocking strip is anchored to the inner surface of the formed web such that the interlocking surface of the second interlocking strip faces the inner surface of the lidstock; and
g) cutting the lidstock and formed web to make the package having a first and second end;

wherein the package is configured such that (i) when the panel section is displaced, and the package is opened,
 (a) the product can be accessed between the first and second interlocking strips,
 (b) the interlocking surface of each of the first and second interlocking strips is at least partially exposed, and
 (c) the package can thereafter be reclosed by folding the package such that the interlocking surface of the first interlocking strip is interlocked with the interlocking surface of the second interlocking strip;
(ii) the interlocking surfaces of the first and second interlocking strips are not exposed until the package is initially opened;
(iii) the interlocking surfaces of the first and second interlocking strips are not interlocked with one another until the package is initially opened and then reclosed;
(iv) the interlocking surface of the first interlocking strip is farther from the first end of the package than the interlocking surface of the second interlocking strip: and
(v) each of the first and second interlocking strips is either pre-anchored to the formed web or lidstock, or is anchored to the formed web or lidstock at any time during the method of making the package.

In a fifth aspect, a method of making an easy-open and reclosable package in a continuous horizontal packaging process comprises:
a) providing a lay-flat web comprising a first and second surface;
b) providing a panel section comprising an outer and inner surface, a first and second side edge, and a first and second end, the inner surface comprising an easy-open sealant,
c) providing a reclosure mechanism comprising a first and second interlocking strip each comprising a first and second side edge, a first and second end, and an interlocking segment having a base surface and an interlocking surface;
d) advancing the lay-flat web to a forming device to convert the lay-flat web into a folded web having an interior surface;
e) advancing the reclosure mechanism and panel section such that when the package is made, the reclosure mechanism and panel section are part of the package;
f) advancing a product to the forming device such that the folded web and panel section envelop the product;
g) longitudinally sealing the folded web and panel section to make a longitudinal seal;
h) transversely sealing the folded web and panel section, with the product therein, to produce a leading transverse seal to define a first pouch;
i) advancing the folded web and panel section, with the leading transverse seal, forward a predetermined distance;
j) transversely sealing the first pouch to produce a trailing transverse seal in the first pouch, and a leading transverse seal in a second pouch, the second pouch disposed upstream of the first pouch; and
k) cutting the folded web and panel section to separate the first pouch from the second pouch to form an individual package comprising the first and second side panel, and the panel section, the package comprising
 the first and second side panels each comprising an outer and inner surface, a first and second side edge, and a first and second end, the first and second side panels joined together along their respective first and second side edges,
 the panel section and second side panel joined along their respective first and second side edges with an easy-open seal,
 a first end defined by the first end of at least one of the panel section and second side panel,
 a second end defined by the second end of the first and second side panels respectively, and
 the first interlocking strip anchored to at least one of the panel section and first side panel such that the interlocking surface of the first interlocking strip faces the inner surface of the panel section, and the second interlocking strip anchored to the inner surface of the second side panel such that the interlocking surface of the second interlocking strip faces the inner surface of the panel section;

wherein the package is configured such that
(i) when the panel section is displaced, and the package is opened,
   (a) the product can be accessed between the first and second interlocking strips,
   (b) the interlocking surface of each of the first and second interlocking strips is at least partially exposed, and
   (c) the package can thereafter be reclosed by folding the package such that the interlocking surface of the first interlocking strip is interlocked with the interlocking surface of the second interlocking strip;
(ii) the interlocking surfaces of the first and second interlocking strips are not exposed until the package is initially opened;
(iii) the interlocking surfaces of the first and second interlocking strips are not interlocked with one another until the package is initially opened and then reclosed;
(iv) the interlocking surface of the first interlocking strip is farther from the first end of the package than the interlocking surface of the second interlocking strip; and
(v) each of the first and second interlocking strips is either pre-anchored to the lay-flat web or panel section, or is anchored to the lay-flat web, folded web, first or second side panel, or panel section at any time before or during the method of making the package.

In a sixth aspect, a pouch comprises:
a) a first and second side panel each comprising an outer and inner surface, a first and second side edge, and a first and second end, the first and second side panels joined together along their respective first and second side edges;
b) a first end;
c) a second end defined by the second end of the first and second side panels respectively;
d) a panel section comprising an outer and inner surface, a first and second side edge, and a first and second end, the inner surface comprising an easy-open sealant, wherein
   the first end of the panel section is joined to the second side panel with an easy-open seal,
   the panel section and the second side panel are joined together along their respective first and second side edges with an easy-open seal, and
   the panel section is anchored to the first side panel;
e) a reclosure mechanism, disposed between the panel section and second side panel, comprising
   i) a first interlocking strip comprising a first and second side edge, a first and second end, and an interlocking segment having a base surface, and an interlocking surface, the first interlocking strip anchored to at least one of the panel section and first side panel such that the interlocking surface faces the inner surface of the first side panel, and
   ii) a second interlocking strip comprising a first and second side edge, a first and second end, and an interlocking segment having a base surface and an interlocking surface, the second interlocking strip anchored to the inner surface of the second side panel such that the interlocking surface faces the inner surface of the first side panel; and
wherein the pouch is configured such that
(i) the interlocking surfaces of the first and second interlocking strips are not interlocked with one another, and
(ii) the interlocking surface of the first interlocking strip is farther from the first end of the pouch than the interlocking surface of the second interlocking strip.

In a seventh aspect, a method of making a bag with a panel section and a reclosure mechanism disposed thereon comprises:
a) extruding a thermoplastic tube to make a bag tubing;
b) providing a panel section comprising an outer and inner surface, a first and second side edge, and a first and second end, the inner surface comprising an easy-open sealant,
c) providing a reclosure mechanism comprising a first and second interlocking strip each comprising a first and second side edge, a first and second end, and an interlocking segment having a base surface and an interlocking surface;
d) slitting the tubing at a longitudinal edge thereof to make a slit bag tubing;
e) disposing the reclosure mechanism on the slit bag tubing; and
f) transversely cutting and sealing the slit bag tubing at predetermined intervals to make a plurality of individual bags, each bag comprising
   a first and second side panel each comprising a first and second end, an outer and inner surface, and first and second side edges, the first and second side panels joined together along at least a portion of their respective first and second side edges by a seal,
   a first end defined by the first end of at least one of the panel section and second side panel,
   an end fold defined by the second ends of the first and second side panels respectively, and
   the reclosure mechanism disposed between the panel section and second side panel, the first interlocking strip anchored to at least one of the panel section and first side panel such that the interlocking surface of the first interlocking strip faces the inner surface of the panel section, and the second interlocking strip anchored to the inner surface of the second side panel such that the interlocking surface of the second interlocking strip faces the inner surface of the panel section;

wherein the bag is configured such that
(i) the interlocking surfaces of the first and second interlocking strips are not interlocked with one another,
(ii) the interlocking surface of the first interlocking strip is farther from the first end of the bag than the interlocking surface of the second interlocking strip,
(iii) at any time during the method of making the bag, the first and second interlocking strips are anchored to the bag tubing, the slit bag tubing, the panel section or the inner surface of the first or second side panel.

BRIEF DESCRIPTION OF THE DRAWINGS

The present invention is illustrated by reference to the following drawing figures, encompassing different views of various embodiments of the invention, wherein:

FIG. 20 is an elevational view of a continuous horizontal packaging process and apparatus for making a package;

FIGS. 22A, 22B, and 22C are each cross-sectional views of a portion of the package, showing a sequence for opening the package;

FIGS. 28A, 28B, and 28C are each plan views of the package, showing a sequence for opening the package.

DEFINITIONS

Figure 1:
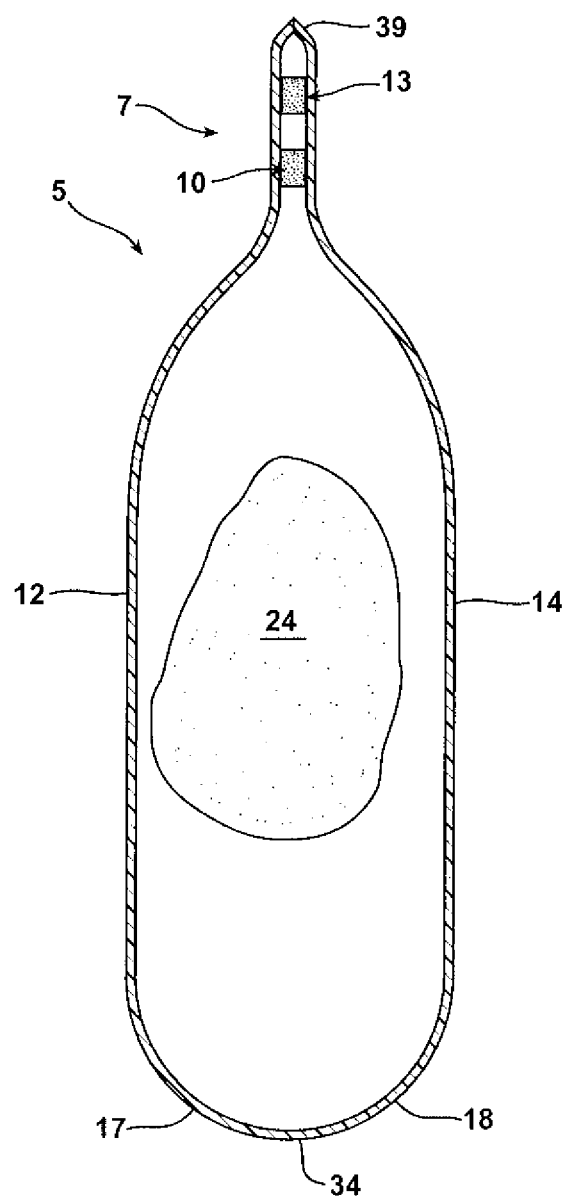
FIG. 1 is an elevational cross-sectional view of a package.

"Anchored", "anchoring" and the like herein refers to sealing or adhering two surfaces together, and refers to the resulting bond between surfaces. Sealing is done by means of a sealant. Adhering is done by means of PSA or permanent adhesive. In processes described herein where a strip is anchored to a web, panel section or side panel, either during a process wherein the web, panel section and strip are advanced, or when a strip has been pre-anchored to the web or panel section before the start of the process, anchoring can be done by use of any suitable continuous or discontinuous sealing or adhesive material and method. Such anchoring is done to hold an interlocking strip or strips to the web or panel section during the relevant packaging process.

In some embodiments, wherein the anchor is already relatively strong or continuous, e.g. a heat seal that constitute either a relatively strong heat seal, or an easy-open seal as defined herein, the anchor functions not only to hold a strip to a web or panel section during a packaging process, but also as a final seal of that surface of the strip to the web or panel section (lay-flat or folded) or panel made from the web. Any subsequent step in the process of sealing one of the surfaces (i.e. the anchored surface) of the strip to a web, panel section or panel, is in these embodiments already completed by the anchoring step, and contact of a seal device, e.g. a seal bar in the region of the anchor, in a subsequent step, may add no further or separate seal to that surface of the strip.

In some embodiments where the bond is a relatively weak or discontinuous one, e.g. a discontinuous seal, spots or narrow stripes of adhesive. etc., in a subsequent step of sealing one of the surfaces of the strip to the web, panel section or panel, a seal bar that seals one of the surfaces of the strip to the web, panel section or panel can contact the web, panel section or panel in the region where the anchor is already disposed. The seal in that region may be either enhanced, or initially created, by the subsequent sealing step.

Anchoring a strip to a surface, as described herein, should be understood as anchoring all, or at least a portion of, the strip to all, or at least a portion of, the surface.

"Anchoring" and the like should be understood to refer herein to a component of the package of the invention anchored either directly or indirectly to another component of the package; e.g. "panel section is anchored to the first side panel" and the like herein can refer to a panel section anchored directly to the first side panel, or alternatively can refer to a panel section anchored directly to e.g. a skirt of an interlocking strip, which in turn is anchored directly to the first side panel. Likewise, "anchoring (or sealing or joining) the first end of the panel section to the second side panel" and the like herein can refer to a panel section anchored (or sealed or joined) directly to the second side panel, or alternatively can refer to a panel section anchored (or sealed or joined) directly to e.g. a skirt of an interlocking strip, which in turn is anchored (or sealed or joined) directly to the second side panel.

"Displaced" and the like herein refers e.g. to a panel section that has been at least partially moved from its original position, and in some embodiments entirely removed from the package, sufficient to open the package and provide access to its contents.

"Easy-open" herein refers to a package that can be manually opened relatively easily.

"Easy-open seal" herein refers to a seal involving two surfaces, in which materials and sealing conditions are chosen such that the package is easy-open with a physical mode of opening that includes any one or more of adhesive failure, delamination failure, or cohesive failure as described herein.

"Easy-open sealant" herein refers to a material chosen for one or both surfaces of an interlocking strip, panel section and web, such that when such surfaces are sealed to each other, the resulting package is easy-open with a physical mode of opening that includes any one or more of adhesive failure, delamination failure, or cohesive failure as described herein.

"Ethylene/alpha-olefin copolymer" (EAO) herein refers to copolymers of ethylene with one or more comonomers selected from $C_3$ to $C_{10}$ alpha-olefins such as propene, butene-1, hexene-1, octene-1, etc., such as linear low density polyethylene (LLDPE).

"Ethylene homopolymer or copolymer" herein refers to polyethylene (PE) such as ethylene homopolymer such as low density polyethylene (LOPE), medium density polyethylene (MOPE), high density polyethylene (HDPE); ethylene/alpha olefin copolymer such as those defined herein; ethylene/vinyl acetate copolymer (EVA); ethylene/alkyl acrylate copolymer such as ethylene/methyl acrylate copolymer (EMA) or ethylene/ethyl acrylate copolymer (EEA), or ethylene/butyl acrylate copolymer (EBA); ethylene/(meth)acrylic acid copolymer; or ionomer resin (IO).

"Exposed" herein means exposed to the exterior environment outside the package.

"Fig." herein refers to drawing figure; "Figs." to drawing figures.

"Film" is used herein to mean a thermoplastic film, laminate, or web, either multilayer or monolayer, that may be used in connection with the present invention. Film can be of any suitable thickness, e.g. between 0.1 and 30 mils.

"Fin seal" is used herein to mean, in the case of a single web, folding one edge of a web towards the opposite edge of the web, and sealing the facing inner surfaces together. In the case of two webs, a fin seal is a seal formed by sealing the inner surface of the edge of one web to the inner surface of a corresponding edge of another web.

"Interlocking assembly" and the like is used herein to refer to a panel section that carries, or has attached, anchored, or sealed to itself, at least one interlocking strip.

"Interlocking strip" and the like is used herein to refer to a strip of material having an interlocking surface that can be mechanically engaged with (interlocked with) another interlocking strip, of the same or different construction, to provide a package that can be opened and reclosed a number of times. Examples of an interlocking strip include, without limitation, 1) zippers such as those associated with the ZIPLOC™ and ZIP-PAK trademarks, and disclosed in e.g. US2003/0103687 A1 (Schneider et al.), but excluding a slide zipper; 2) interlocking alternating hook-shaped closure members, and hook and loop fasteners such as those associated with the VELCRO™ trademark, and disclosed in e.g. US2006/0062496 A1 (Clune et al.); 3) fasteners employing self-engageable fastener elements such as those associated with the APLIX™ trademark, and disclosed in US 2010/0135600 A1 (Ducauchuis et al.) and U.S. Pat. No. 7,841,052 B2 (Ducauchuis); and 4) fasteners utilizing interference fit, e.g. as shown in U.S. Pat. No. 3,727,829 (Huni); all these US patent publications and patents incorporated by reference in their entirety. An "interlocking surface" herein will typically be three-dimensional. It will be understood that in many embodiments of the invention, only a portion of the interlocking surface of each of the respective interlocking strips will be exposed when the panel section is displaced, e.g. because of the presence of side seals that will prevent edge portions of the respective interlocking surfaces from being exposed. Likewise, in many embodiments of the invention, when the package is reclosed, only a portion of the exposed respective interlocking surfaces will be interlocked with one another, e.g. because of differences in the manner in which the user recloses the package.

"Lap seal" is used herein to mean a seal made by sealing an inside surface of a web to an outside surface of a web. The inside and outside surfaces can both be on a single web; or the inside surface can be of one web, and the outside surface of a second web.

"Lidstock" herein refers to a film used to cover a container or tray that carries a product, and can be sealed to the tray, typically as a perimeter heat seal. Lidstock typically is supplied to a food processor in a lay flat film rolled onto a roll.

"Longitudinal seal" herein refers to a fin seal or lap seal.

"Olefinic" and the like herein refers to a polymer or copolymer derived at least in part from an olefinic monomer.

"Oxygen barrier" and the like herein refers to materials having an oxygen permeability, of the barrier material, less than 500 cm$^3$ O$_2$/m$^2$·day·atmosphere (tested at 1 mil thick and at 25° C., 0% RH according to ASTM D3985), such as less than 100, less than 50, less than 25, less than 10, less than 5, and less than 1 cm$^3$ O$_2$/m$^2$·day·atmosphere. Examples of polymeric materials useful as oxygen barrier materials are ethylene/vinyl alcohol copolymer (EVOH), polyvinylidene dichloride (PVDC), vinylidene chloride/methyl acrylate copolymer, vinylidene chloride/vinyl chloride copolymer, polyamide (nylon), and polyester (PET).

"Polymer" and the like herein means a homopolymer, but also a copolymer thereof, including terpolymer, tetrapolymer, block copolymer, etc.

"Pouch" herein means a pouch or bag.

"Pre-anchored" herein means an embodiment wherein an interlocking strip has been anchored to a web or panel section before the start of the relevant process. For example, an interlocking strip can be anchored to a lay-flat web by a supplier of the web, and the rolled up web, with the interlocking strip anchored thereto, can then be supplied to a packager who uses the web and strip in any of the processes disclosed herein.

"Reclosable" herein refers to a feature or function of a package whereby a package can be reclosed by folding the package such that a first interlocking strip is brought into interlocking engagement with a second interlocking strip.

"Reclosure mechanism" herein refers to a first and second interlocking strip, each strip including a first and second side edge, a first and second end, and an interlocking segment having a base surface and an interlocking surface.

"Registration device" herein refers to any mark, pattern, or feature of a web, panel section or interlocking strip, that facilitates the advancement of the web, panel section or strip, in a controlled manner, into a packaging machine, where the web, panel section or strip is used to make individual packages. The device can be e.g. printed, as for example an eyespot, or placed in uniformly spaced fashion along or near an edge of the web, panel section or strip, i.e. registration marks, or in an area near the middle of a web, etc. that does not interfere with decorative printed graphics. These marks are used in connection with appropriate sensors to controllably advance the web, panel section or strip.

"Seal" herein means a bond between two thermoplastic surfaces, e.g. as produced by heat sealing, radio frequency (RF) sealing, ultrasonic sealing, permanent adhesive, or repositionable adhesive or PSA, or a combination of any of these modes of sealing. Sealing a strip to a surface, as described herein, should be understood as sealing all, or at least a portion of, the strip to all, or at least a portion of, the surface.

"Sealant" is a polymeric material or blend of materials, such as olefinic polymer or copolymer such as an ethylenic polymer or copolymer, that can form a surface of an interlocking strip or panel section or a web to which the strip or panel section is sealed, and form a bond between two thermoplastic surfaces. A permanent or a repositionable adhesive such as pressure sensitive adhesive can also be a sealant.

"Strip" herein refers to an elongate piece of e.g. thermoplastic material, typically longer in a first direction than in a direction perpendicular to the first direction, e.g. rectangular; but can also be square, round, oblong, elliptical, or any appropriate shape in plan view. The strip can be of any suitable thickness, e.g. between 0.1 and 30 mils.

"Thermoplastic" herein includes plastic materials that when heated to a softening or melting point may be reshaped without significant thermal degradation (burning). Thermoplastic includes both materials that are not crosslinked, or that are crosslinked by chemical or radiation means.

"Tray" herein refers to a formed member that has a tray bottom, tray sides, and a tray flange around the upper perimeter of the tray, where the tray bottom and tray sides form an internal cavity within which a product can be placed. The cavity can be enclosed by a lidstock sealed to the tray flange.

"Web" is used herein to mean a thermoplastic film, laminate, or web, either multilayer or monolayer, that may be used in connection with the present invention. The web can be of any suitable thickness, e.g. between 0.1 and 30 mils, and the web can be of any suitable length and width.

"Zipper" and the like herein refers to a plastic zipper closure, press-to-close or slide zipper, interlocking closure, reclosable fastener with interlockable fastener elements, interlocking rib and groove elements having male and female profiles, interlocking alternating hook-shaped closure, and the like.

All compositional percentages used herein are presented on a "by weight" basis, unless designated otherwise.

Drawings herein are not necessarily to scale, and certain features of the invention may be graphically exaggerated for clarity.

DETAILED DESCRIPTION OF THE INVENTION

1. Package

Referring to the drawings, a package 5 according to the invention is shown. Package 5 includes a pouch 7 that can be made from either a single web, or two webs, and a panel section 6, to form a first or front side panel 12, and a second or back side panel 14. When a product 24 is placed in the pouch 7, by any suitable process such as processes herein disclosed, and the pouch 7 is closed, the package 5 is made.

A. Web(s)

The web or webs (hereinafter "web") comprises a thermoplastic material of any suitable composition, e.g. those having as at least one component olefinic materials such as ethylene or propylene polymers or copolymers, e.g. polyethylene or ethylene/alpha olefin copolymers; or polyethylene terephthalate (PET). A suitable web includes those typically used in, or useful in, HFFS, VFFS, lidstock/tray, continuous horizontal packaging, and bag making apparatus and processes. The web can be monolayer or multilayer in construction, can be coextruded, laminated, or made by any suitable film making process, and can have any suitable thickness. Examples of a web useful in the invention include H7225B™, a barrier hybrid material used for products requiring a high oxygen barrier, such as shredded cheese; H7525B™, a barrier hybrid material used for products requiring a high oxygen barrier, such as bacon and smoked and processed meat; H7530B, like H7525B but having a thickness of about 3 mils; CP04140™, a low barrier (high OTR) material used in produce packaging, CPM4090, a microwaveable packaging film for fresh cut produce; and T7225B™, a barrier material used as lidstock for products requiring a high oxygen barrier, such as luncheon meat. These are all commercial products produced by the Cryovac business unit of Sealed Air Corporation. In some embodiments, for example in the packaging of produce, the web will typically not have an oxygen barrier layer.

Referring to the drawings, the front of the package, comprising the first side panel 12 and panel section 6, has a top portion 15, a first side edge 31 and second side edge 33, and a lower portion 17. The second side panel 14 has a top portion 11, a first and second side edge (not shown), and a lower portion 18. In a finished package, the first and second side edges 31 and 33 of first side panel 12 will typically be congruent with the first and second side edges of second side panel 14. The first and second side panels 12 and 14 are joined together along their respective first and second side edges by either a seal or a fold. First side edge 31 of first side panel 12 is joined to the first side edge of the second side panel 14 by a seal 30. Second side edge 33 of first side panel 12 is joined to the second side edge of the second side panel 14 by e.g. a heat seal 32. The second end 34 of the pouch 7 can be either a seal or a fold. Where a single web is used to make the pouch, second end 34 will typically be a fold, although even after the web is folded, a seal such as a heat seal can optionally be installed in the area of the fold. Where two webs of film are used to make panels 12 and 14, second end 34 will be a seal that joins panels 12 and 14 together along their respective lower portions 17 and 18. The two webs can be from the same material, or can be different in composition, structure, etc.

B. Panel Section

The package of the invention includes panel section 6, shown in e.g. FIGS. 2, 3, 6, 7, 22A, 25, and 27 through 30. Panel section 6 has an outer surface 66 and inner surface 67, and can each be of any suitable dimension and shape. The inner surface 67 in one embodiment comprises an easy-open sealant. A functional equivalent to an inner surface comprising an easy-open sealant, can be an easy-open sealant on an inner surface of the first or second side panel of the package, or one of the surfaces of the first or second interlocking strip. The panel section can be anchored to either the outer or inner surface of the first side panel, e.g. near the first end of the first side panel. Alternatively, the panel section is not directly anchored to the first side panel, but is juxtaposed end to end with the first side panel, and anchored to the first side panel by a skirt of the first interlocking strip that is anchored to the inner surface 67 of panel section 6. Any suitable web, including any of the hybrid materials of the type described herein for web materials, e.g. H7225B or a non-barrier analog of such material, can be used to make the panel section 6.

C. Interlocking Strips

Figure 4:
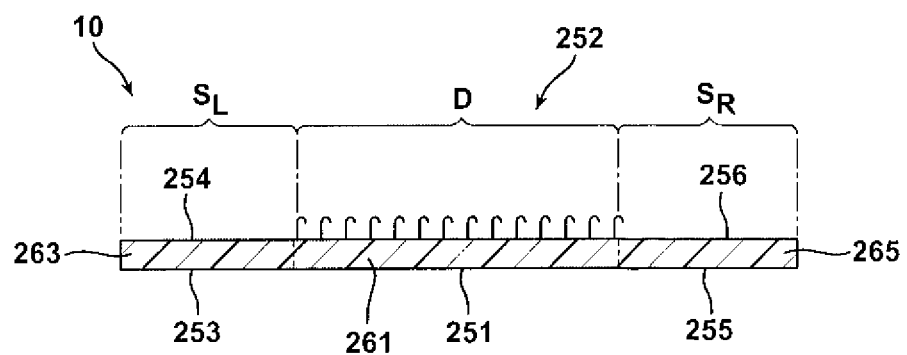
FIG. 4 is a schematic view of an interlocking strip.

Referring to FIG. 4, first interlocking strip 10 in accordance with the invention includes an interlocking segment "D" of the strip, having a base portion 261, a base surface 251 and interlocking surface 252. Surface 252 can comprise e.g. a field of hook-shaped features that can be engaged with a complementary field of loop-shaped features disposed on a second interlocking strip, or vice versa. Alternatively, a set of mushroom or T-shaped features, such as disclosed in US 2010/0135600 A1 can be employed. More broadly, any suitable interlocking mechanism can be employed. Surface 252 of interlocking segment "D" is attached, imbedded in, or otherwise connected to base surface 251, or alternatively included as an integral component, e.g. a molded or extruded component, of interlocking segment "D" or of strip 10.

Interlocking strip 10 can optionally include a first skirt segment denoted by region $S_L$, and/or a second skirt segment denoted by region $S_R$. These skirt segments may be useful in the manufacture of strip 10, and may also be useful in anchoring strip 10 to a web or panel section. Skirt segment $S_L$ is shown with a base portion 263, a base surface 253 and a second surface 254. Skirt segment $S_R$ is shown with a base portion 265, a base surface 255 and a second surface 256. Strip 10 can alternatively include additional or alternative skirt segments such that interlocking segment "D" is bounded on some or all of its sides by a skirt segment.

Second interlocking strip 13 can be configured like first interlocking strip 10, or can be of any suitable alternative construction, provided it can be brought in interlocking engagement with strip 10 to reclose the package after the package has been initially opened.

Both interlocking strips 10 and 13, and their analogs disclosed in the present application, are disposed between the front of the package comprising first panel 12 and panel section 6, and second panel 14. Typically strips 10 and 13 are spaced apart from the first and second ends of the pouch, but strip 10 is disposed farther from the first end of the pouch than strip 13. In one embodiment, strip 13 is disposed at the first end of the pouch. Typically, strips 10 and 13 are parallel to one another, and spaced apart from each other sufficiently to enable the package, after opening, to be folded at a fold region disposed between the strips, such that the second strip 13 can be brought into engagement with the first strip 10 to reclose the package. The package can be reopened by separating the two interlocking strips to access the package contents.

Strips 10 and 13 can be of any suitable dimension, and will typically be longer in length than in width, with the length of the strip 10 being e.g. greater than two times the width of the strip, e.g. greater than 3, 4, or 5 times the width. A typical dimension for the strips is a width of from about 0.25 inches to 1.5 inches and a length of about 7 inches. The strips will be shorter in at least one dimension than the pouch and package. For example, the strips can extend across the transverse width of a pouch made in a HFFS or VFFS process, but will be significantly narrower than the length of the package (see e.g. FIG. 3). In one embodiment, the strips will occupy less than 50%, such as less than 40%, less than 30%, less than 20%, or less than 10% of the length of the package. The strips can in another embodiment be shorter in both dimensions than the pouch and package. The strip can occupy e.g. less than 50%, such as less than 40%, less than 30%, less than 20%, or less than 10% of each of the length and width of the package. The first end of strip 13 will be typically within about three inches of the first end 15, 16 of the pouch. Strip 13 can be closer than this, such as within about two inches, one and one quarter inches, one inch, 0.75 inches, 0.5, 0.4, 0.3, 0.2, or 0.1 inches of the first end of the pouch. The strips can each be of any suitable thickness, for example have a thickness of between 1 and 20 mils, such as between 3 and 18 mils, between 5 and 15 mils, or any thicknesses therebetween. Strip 13 can have the same dimensions as strip 10, or different dimensions from strip 10.

One or more of the surfaces of strips 10 and 13 comprise a sealant. In one embodiment, the second surface 254 of skirt segment $S_1$ of strip 10 is anchored to the inner surface 27 of the first side panel 12, and surfaces 251, 253 and/or 255 of strip 13 are anchored to the inner surface 29 of the second side panel 14. In this arrangement, optionally the second surface 256 of skirt segment $S_R$ is sealed to the inner surface 67 of the panel section 6 with an easy open seal. In some embodiments, the first and second strips 10 and 13 are sealed to the inner surfaces 67 and 29 of panel section 6 and second side panel 14 respectively only along the first and second side edges of the package. In other embodiments, the strips are sealed to the respective inner surfaces of the package along a portion of, or along the entire width of the package.

D. Interlocking Assembly/Package Construction

The first and second interlocking strips, panel section, and web can be incorporated into a package in accordance with the invention in any suitable manner.

For example, in one embodiment, the panel section is anchored to a web, a first interlocking strip is then anchored to the panel section, and a second interlocking strip is separately anchored to the web to produce the package of the invention. Each of these steps can be performed at a packaging facility, with the packager advancing web, panel section, and first and second interlocking strips, as well as product, as needed to produce the package of the invention.

Alternatively, a panel section can be pre-anchored to a web by a producer or supplier of the panel section and web, either from a single or multiple source, and the resulting web and attached panel section can be supplied to a packager, who can then provide and install the interlocking strips and the product to produce the package.

In yet another embodiment, a first interlocking strip is anchored to a panel section by a producer or supplier of each, either from a single or multiple source, and the resulting interlocking assembly (i.e. panel section and at least one interlocking strip) is supplied to a packager, who can then install the interlocking assembly, and a second interlocking strip on the web, and provide a product, to produce the package.

In still another alternative, an interlocking assembly including both first and second interlocking strips anchored to a panel section can be provided to a packager, who can then attach this assembly to a web, and make a package as described herein.

Where an interlocking strip has been initially anchored to a panel section, suitable anchoring steps can be subsequently performed to insure that if desired, a given interlocking strip, already attached to a panel section, can be simultaneously or subsequently anchored to a second side panel, or to a portion of a web that will ultimately form a second side panel of a package of the invention.

Thus, any suitable combination of steps can be performed, involving a web, panel section, first and second interlocking strips, and product, to produce a package of the invention.

Figure 27:
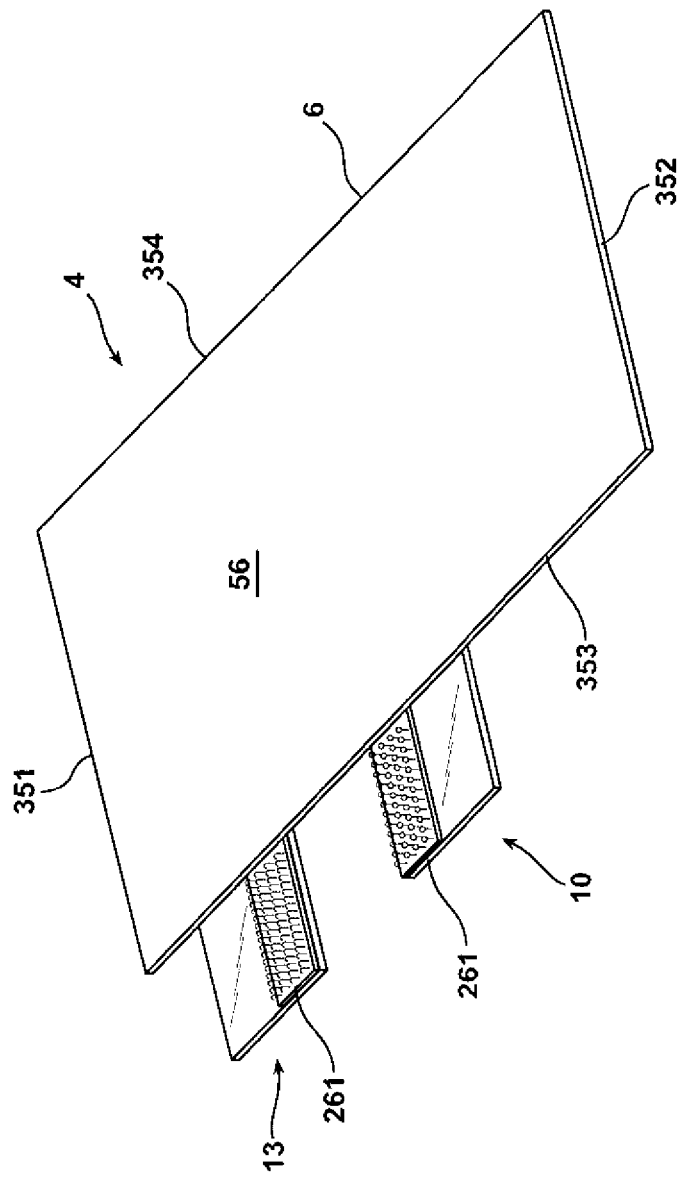
FIG. 27 is a perspective blown-up view of an interlocking assembly.
Figure 28C:
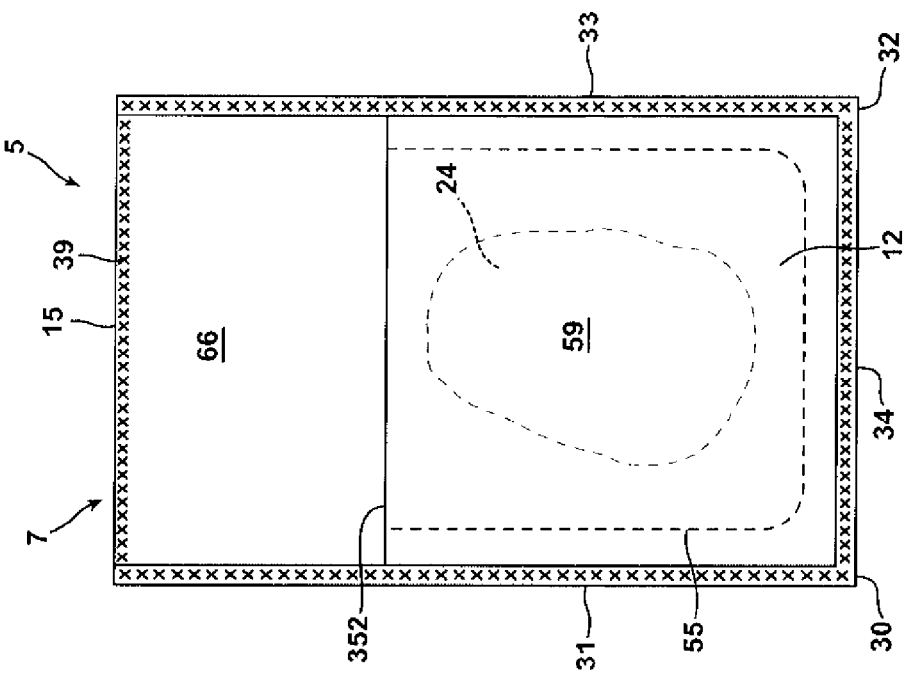
Figure 28D:
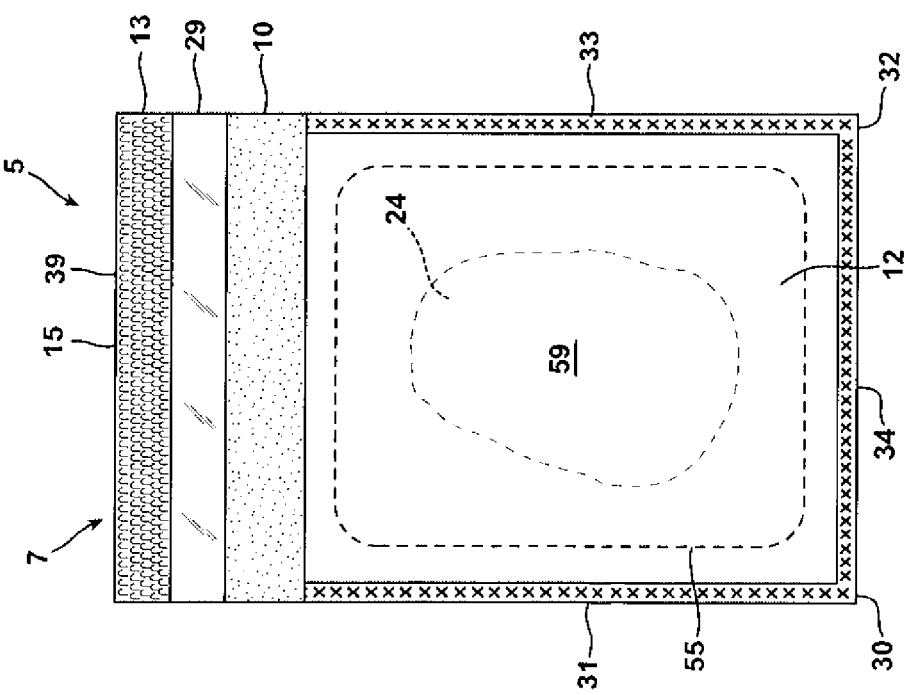
FIGS. 28D and 28E are each plan views of another embodiment of the package, showing a sequence for opening the package.
Figure 28E:
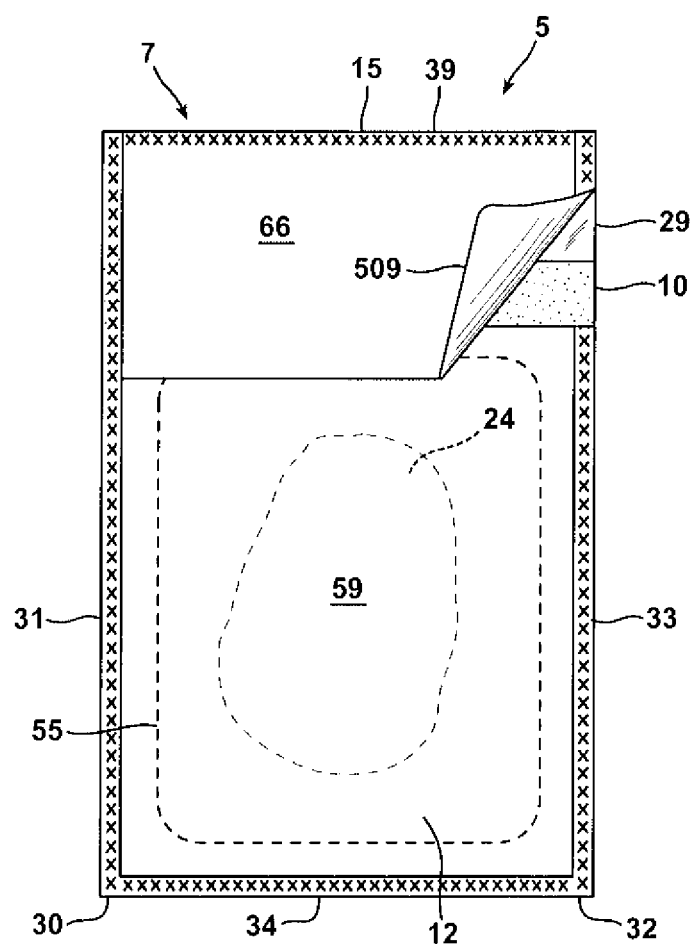

FIG. 27 shows a perspective blown-up view of an interlocking assembly 4 in accordance with an embodiment of the invention. The interlocking assembly includes a panel section 6 including a first side edge 353, a second side edge 354, a first end 351, a second end 352, first interlocking strip 10 and second interlocking strip 13. Each of the components of interlocking assembly 4 can have any suitable dimensions.

Opening Mechanisms

The package of the invention can be easily manually opened, by displacing the panel section 6 as described herein. In some embodiments, where an easy-open supplemental seal is additionally present, any suitable mechanism or combination of mechanisms for obtaining this functionality and feature can be used according to the invention. One mechanism is adhesive failure, where two surfaces each comprises a polymeric composition that, when the surfaces are sealed together, form an easy-open seal. This seal provides the interface that breaks apart upon manually opening the package. In some embodiments, the polymeric compositions of the two sealed surfaces will be the same or similar. In other embodiments, the compositions of the two surfaces will differ, i.e. dissimilar sealants are used. Another mechanism is delamination failure, where the interlaminar bonds between layers of a material, such as a multilayer film, can be broken. Thus, the interlaminar bond provides the interface that will break apart upon manually opening the package. Yet another mechanism is cohesive failure, where a layer of a material such as a film fractures when the package is opened.

Figure 23:
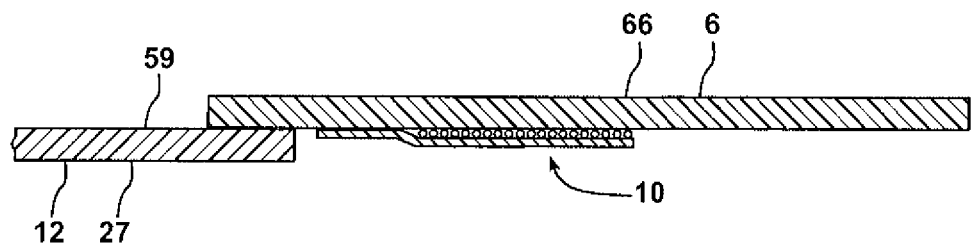
FIG. 23 is a partial cross-sectional view of a portion of the first side panel and interlocking assembly in one embodiment.
Figure 24:
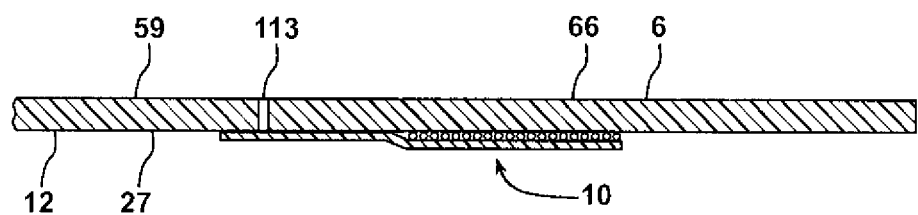
FIG. 24 is a partial cross-sectional view of a portion of the first side panel and interlocking assembly in another embodiment.
Figure 25:
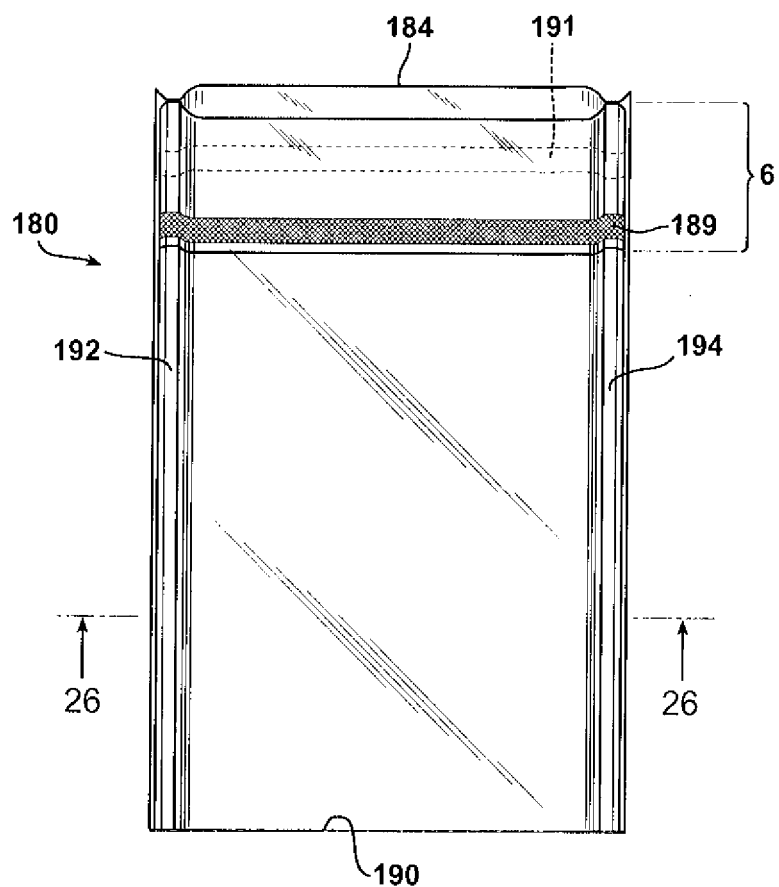
FIG. 25 is a plan view of an alternative embodiment of the invention.

Optionally, especially for applications where hermeticity of the package is required before the package is first opened, an easy-open supplemental seal, of any suitable geometry, can be used to seal the inner surface of the panel section to the end of strip 10 closest to the first end of the package; to the second strip 13; or to the inner surface of the second side panel (see e.g. easy-open supplemental seal 38 of FIGS. 23 and 24). Alternatively, an easy-open supplemental seal can be used to seal strip 10 to the second strip 13; or to the inner surface of the second side panel. The easy-open supplemental seal can be installed at any suitable location in the package, and when appropriately placed, helps reduce the possibility that oxygen from outside the package can enter the package. An easy-open supplemental seal can be made by the use of an easy-open sealant placed on the surface of, or forming a surface layer of, any of the first and second interlocking strips, or the inner surface of the panel section or first or second side panels.

Figure 2:
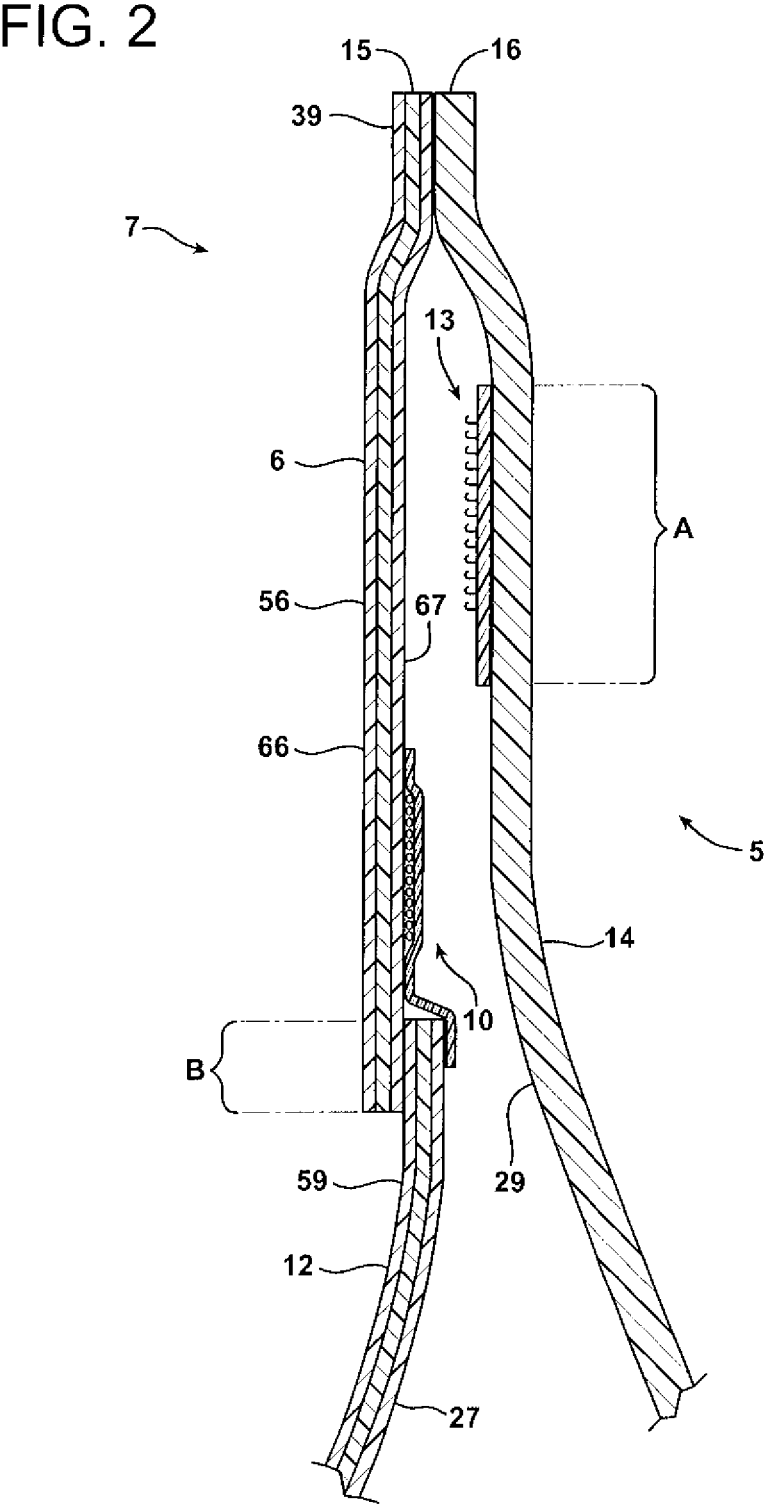
FIG. 2 is an elevational cross-sectional view of a portion of a package.
Figure 3:
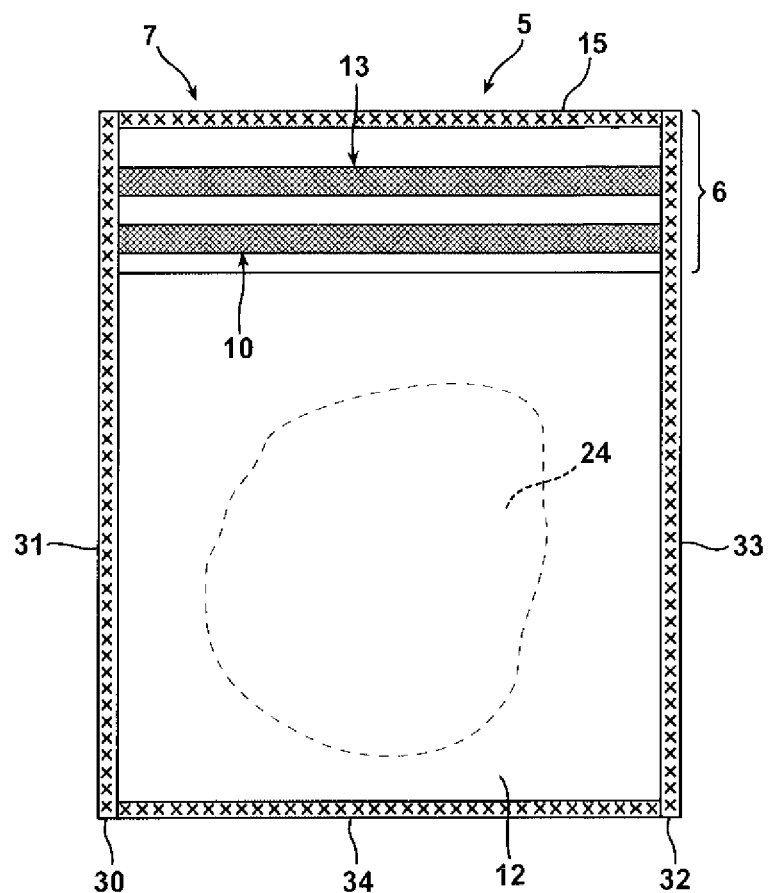
FIG. 3 is a front view of the package of FIG. 1.

Referring to FIG. 2, strip 10 is anchored to the inner surface 27 of first side panel 12 at anchor region "B" with a relatively strong seal. Optionally, another portion of the strip is sealed to the inner surface 67 of panel section 6 with an easy-open heat seal. Strip 13 is anchored to the inner surface 29 of second side panel 14 at anchor region "A" with a relatively strong seal.

The invention is characterized by the fact that:
when the panel section is displaced and the package is opened, the product can be accessed between the first and second interlocking strips, the first and second interlocking surfaces are at least partially exposed, and the package can thereafter be reclosed by folding the package such that the interlocking surface of the first interlocking strip is interlocked with the interlocking surface of the second interlocking strip;
the first and second interlocking strips are not exposed until the package is initially opened;
the first and second interlocking strips are not interlocked with one another until the package is initially opened and then reclosed;
the first interlocking strip is farther from the first end of the package than the second interlocking strip.

2. Method of Making a Package
A. Horizontal Form/Fill/Seal (HFFS)

HFFS packaging systems are generally well known to those of skill in the packaging industry, and can be used to make packages of the present invention.

Figure 5:
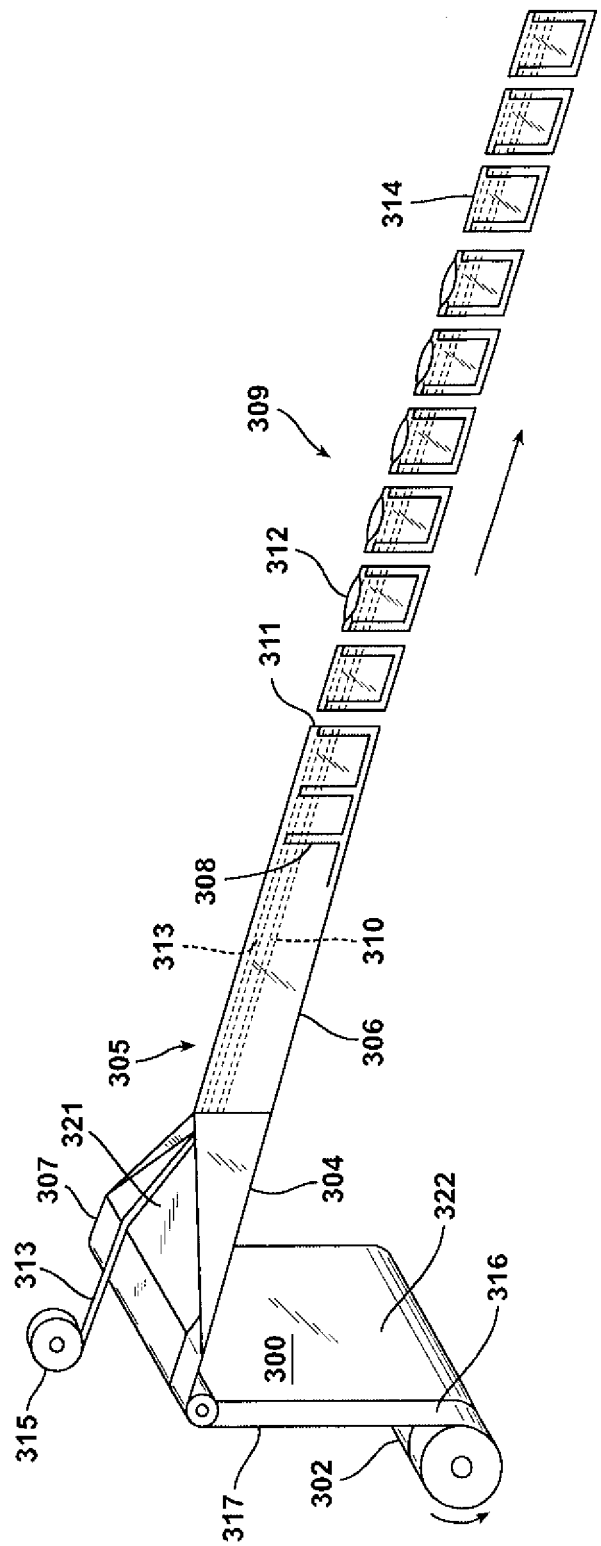
FIG. 5 is a perspective view of a HFFS process and apparatus for making a package.

Referring to FIG. 5, lay-flat web 300, having a first surface 321 and a second surface 322, is unwound from roll 302, then advanced to forming plow 304 to convert lay-flat web 300 to folded web 305 (typically a centerfold film). The second end of each of the pouches to be made will comprise a second end fold 306. Second end fold 306 therefore is equivalent to second end 34 of FIG. 1. This second end fold can be optionally sealed, or left as a folded second end of the pouch. Side seals 308 are made to define a plurality of vertically arranged pouches 309. Each pouch 309 is cut off from the trailing edge of web 300 by an appropriate cutting mechanism (not shown) at position 311, a product 24 (see FIG. 1) is inserted or dropped into the open mouth 312 of each pouch, and the pouch mouth 312 is then closed by a suitable sealing mechanism such as a heat sealer (not shown) to create a seal 314, and produce a package including a first and second side panel, and a panel section (see FIG. 2).

Panel section 6, first interlocking strip 310, and second interlocking strip 313 can be introduced into the HFFS process in a number of ways. For example, panel section 6 can be unwound from a roll in the vicinity of roll 302, and disposed on lay-flat web 300 prior to, or as web 300 is being folded into folded web 305. The panel section is disposed on the web such that the panel section overlaps the lay-flat web sufficient to allow the panel section to be anchored to the web.

Alternatively, the panel section can be installed on the lay-flat web prior to the start of the HFFS packaging process. This can be accomplished off-site from the processor, e.g. by the supplier of the web roll 302.

Likewise, first and/or second interlocking strips 310 and 313 and/or the panel section can be installed on the lay flat web 300 or panel section 6 during the HFFS process, prior to, or as web 300 is being folded into folded web 305. Strips 310 and 313 can thus be installed on the pouch in the same overall HFFS process that achieves production of the pouch, loading of a product into the pouch, and completion of the package.

Strips 310 and 313 are incorporated into the pouch and after cutting and sealing as described herein, are disposed between and anchored to the inner surfaces of the first and second side panels and panel section of each package, such that the interlocking surface of each of strips 310 and 313 faces the inner surface of the panel section.

Alternatively, first and/or second interlocking strips 310 and 313 can be installed on the lay-flat web or the panel section prior to the start of the HFFS packaging process. This can be accomplished off-site from the processor, e.g. by the supplier of the web roll 302.

As shown in the embodiment of FIG. 5, interlocking strip 313, equivalent to strip 13 of FIG. 2, is unwound from a roll 315, and disposed on lay-flat web 300 prior to, or as web 300 is being folded into folded web 305. Strip 313 is oriented such that its base surface 251 faces first surface 321 of web 300. Strip 313 is disposed on the web at, or near and spaced apart from, and parallel to, the first longitudinal edge 307, and spaced apart from and parallel to second longitudinal edge 317, of lay-flat web 300. Strip 313 is thus disposed to position the strip, in each individual pouch made by the HFFS process, near and spaced apart from the first end of each pouch, i.e. near and below the open mouth 312, or alternatively at the first end of each pouch. Interlocking assembly 316, including panel section 6 and strip 310 anchored to panel section 6, is in this embodiment installed on the lay-flat web prior to the start of the HFFS packaging process. This can be accomplished e.g. off-site from the processor, e.g. by the supplier of the web roll 302. Strip 310 is disposed on the panel section, and the panel section in turn is positioned on the lay-flat web such that strip 10 typically is disposed, in each individual pouch made by the HFFS process, below and parallel with strip 313. Strip 310 is oriented such that its interlocking surface 252 faces inner surface 67 of panel section 6. Strip 310 is typically disposed on the panel section spaced apart from, and parallel to, the first and second longitudinal edges 307, 317 respectively of lay-flat web 300

Optionally, strips 310 and 313 can be tacked by a discontinuous seal, adhesive, or the like to web 300 to keep the strips in place during the HFFS packaging process. Alternatively, they can be permanently anchored to the web or panel section, and any easy-open supplemental seal as described herein, can be installed at this point or later in the process, e.g. by a suitable sealing mechanism such as a heat sealer (not shown).

In alternative embodiments, strips 313 and 310 can be disposed on the web in any suitable arrangement. For example, the strips can be fed onto web 300 or panel section 6 such that strip 313 is near and spaced apart from the end fold 306 of each pouch, i.e. near and above the end fold at the bottom of each pouch. Strip 310 can be disposed such that in the final pouch, strip 310 is further from end fold 306 than strip 313. The panel section is suitably arranged such that the opening mechanism disclosed herein can be used in these alternative embodiments to open the package, by displacing the panel section, and exposing at least a portion of the interlocking surfaces of the first and second interlocking strips.

Figure 6:
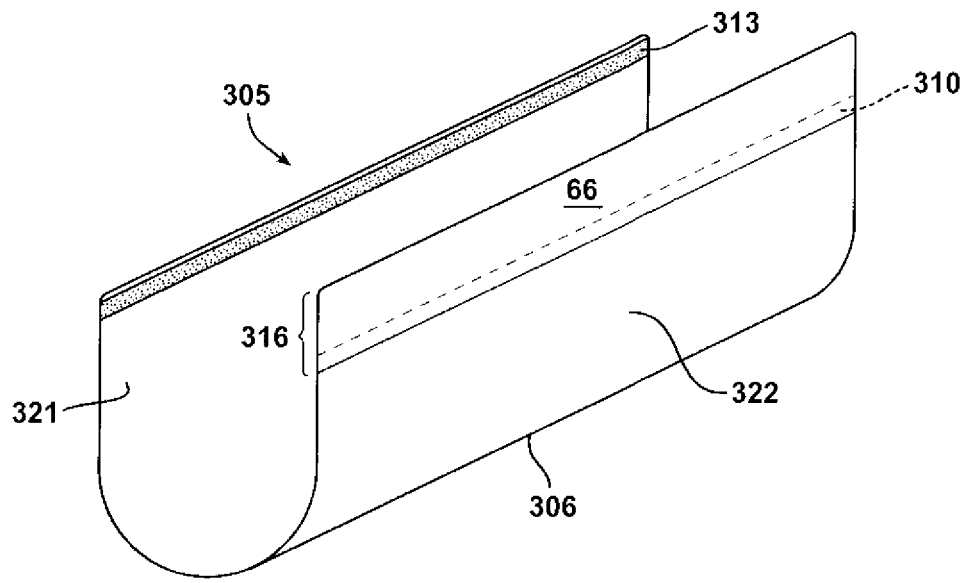
FIG. 6 is a perspective view of a section of folded web.
Figure 7:
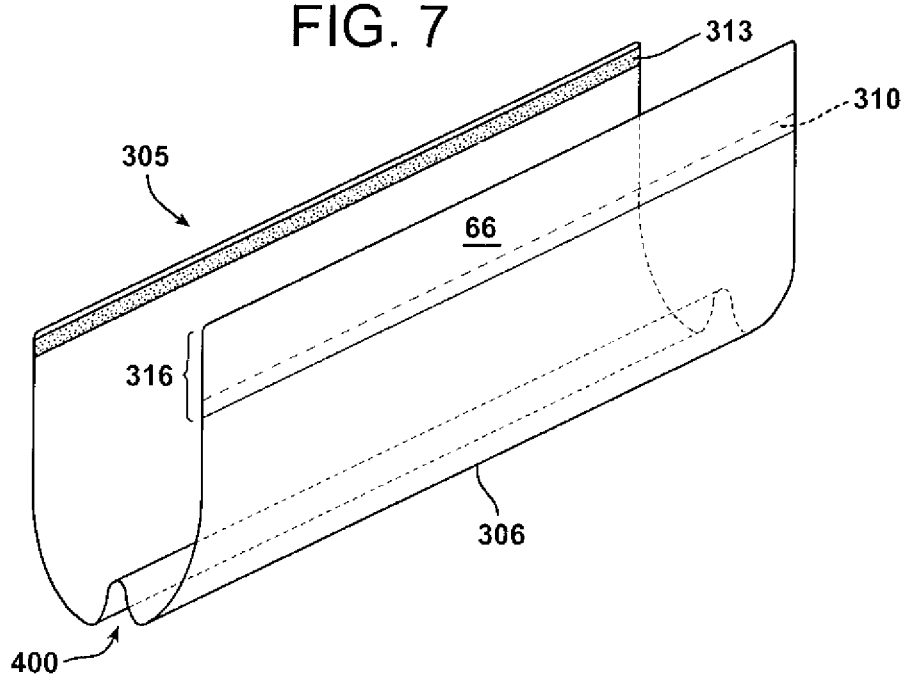
FIG. 7 is a perspective view of a section of gusseted folded web.

FIG. 6 is a view of a section of folded web 305. Strip 313 is disposed, and optionally attached to, what will become inner surface 27 of second side panel 14 of the package, and strip 310 is disposed, and attached to, what will become inner surface 67 of panel section 6 and inner surface 27 of the first side panel of the package, such that upon sealing the web to create a pouch, panel section 6 and first and second side panels 12 and 14 (see FIG. 2) will trap strips 310 and 313 between them. FIG. 7 is similar to FIG. 6, but shows an optional gusset 400 that can be made in the second end fold 306 of the folded web. A gusseted second end provides a stand-up pouch feature in the final package. Gusseting can be accomplished by any suitable means known to those of skill in the art.

B. Vertical Form/Fill/Seal (VFFS)

Figure 8:
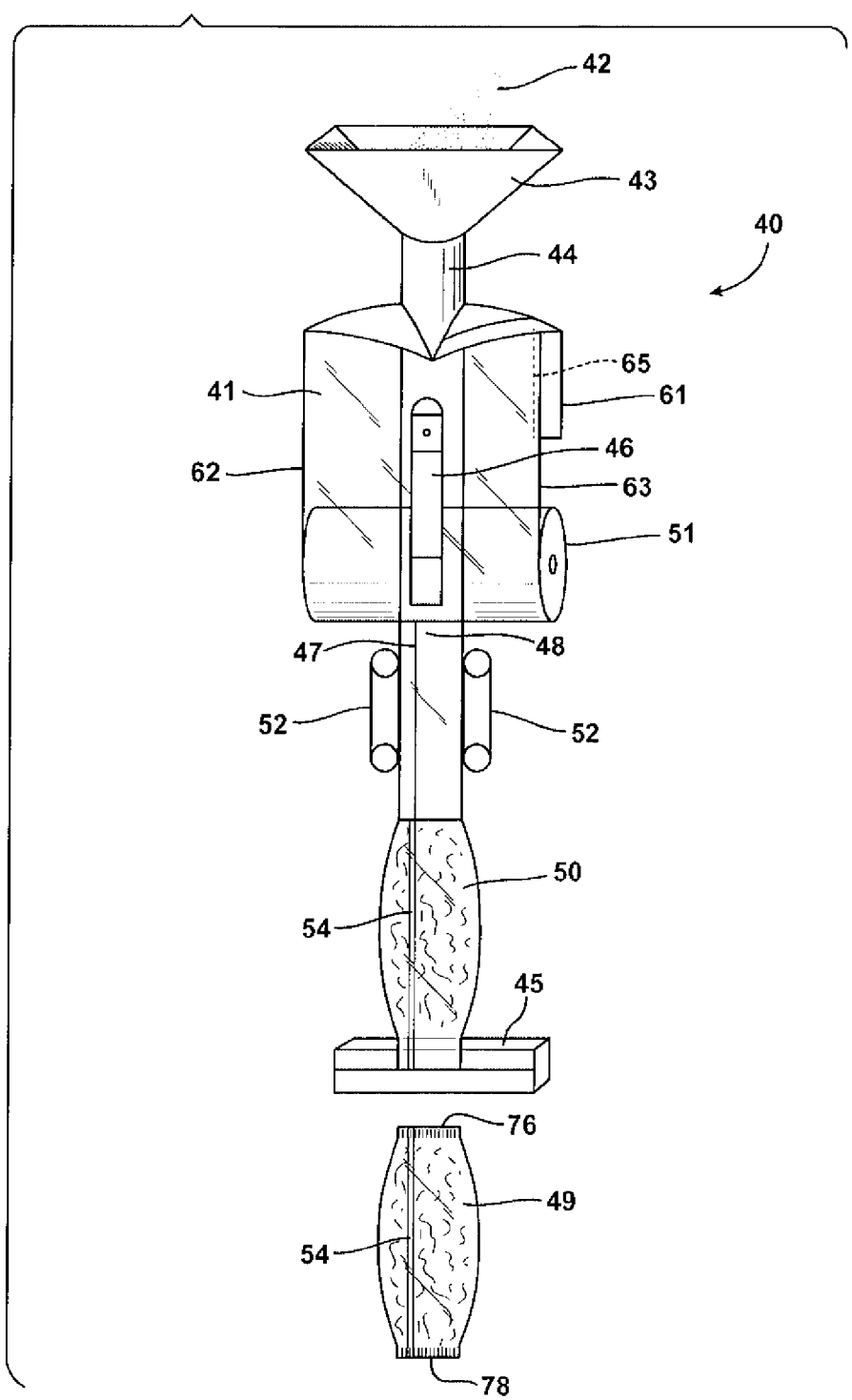
FIG. 8 is an elevational view of a VFFS process and apparatus for making a package.
Figure 9:
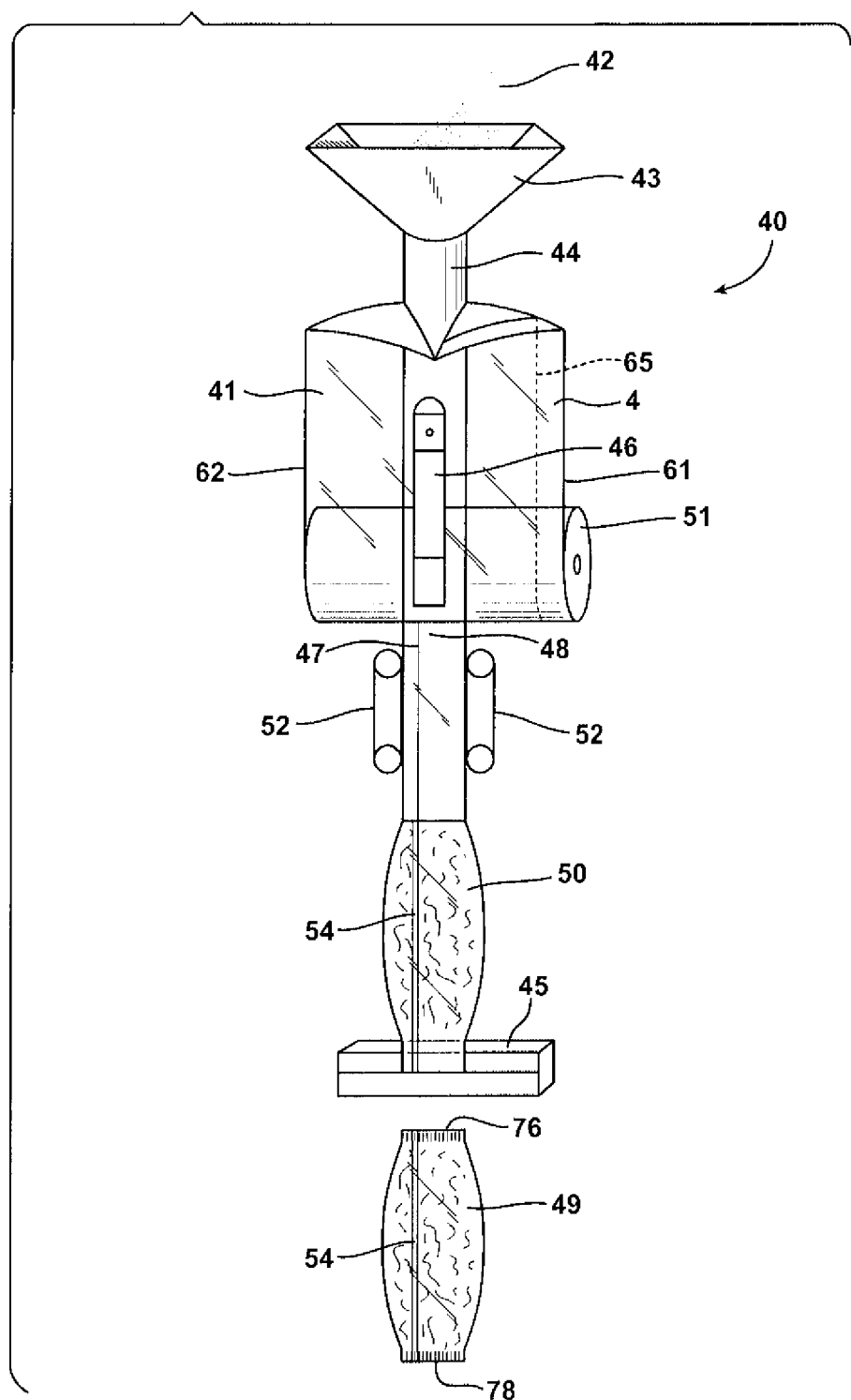
FIG. 9 an elevational view of a VFFS process and apparatus for making a package according to another embodiment.

FIGS. 8 and 9 show a VFFS apparatus and process according to some embodiments of the invention. VFFS packaging systems are generally well known to those of skill in the art, and described for example in U.S. Pat. No. 4,589,247 (Tsuruta et al) and U.S. Pat. No. 4,808,010 (Vogan), both incorporated herein by reference in their entirety.

Apparatus 40 utilizes a lay-flat web 41 as a rollstock. Product 42 is manually or mechanically supplied to apparatus 40, from which a predetermined quantity of product 42 reaches the upper end portion of forming tube 44 via funnel 43, or other conventional means. The packages are formed in a lower portion of apparatus 40, and web 41 is fed vertically upward from feed roll 51, and over forming bars (not shown), wrapped about forming tube 44, and provided with a longitudinal fin seal or lap seal 47 by longitudinal heat sealing device 46, resulting in a vertically-oriented folded web in the form of a tube 48. Transverse heat seal bars 45 close and seal horizontally across the lower end of vertically-sealed tube 48, to form a pouch 49 which is then packed with product 42. Film drive belts 52, powered and directed by rollers or suitable alternative motive means, advance tube 48 and pouch 49 vertically downward a predetermined distance, after which seal bars 45 close and simultaneously seal horizontally across the lower end of vertically-sealed tube 48 and across the upper end of sealed pouch 49 to form a package. The next pouch 50 is then filled with product 42 and advanced, and the cycle is repeated. A cut-off knife (not shown), incorporated with the seal bars 45, severs a lower sealed pouch 49 from the bottom of upstream pouch 50.

As with the HFFS process, panel section 6, and a first and second interlocking strip can be introduced into the VFFS process in a number of ways. For example, panel section 6 can be unwound from a roll in the vicinity of roll 51, and disposed on lay-flat web 41 prior to, or as web 41 is being wrapped about forming tube 44. The panel section is disposed on the web such that the panel section overlaps the lay-flat web sufficient to allow the panel section to be anchored to the web.

Alternatively, the panel section can be installed on the lay-flat web prior to the start of the VFFS packaging process. This can be accomplished off-site from the processor, e.g. by the supplier of the web roll 51.

Likewise, first and/or second interlocking strips 54 and 84 (see e.g. FIGS. 12 through 14), equivalent to 10 and 13, and 310 and 313, can be installed on the lay flat web 41 or panel section 6 during the VFFS process, prior to, or as web 41 is being wrapped about forming tube 44. Strips 54 and 84 can thus be installed on the pouch in the same overall VFFS process that achieves production of the pouch, loading of a product into the pouch, and completion of the package. Strips 54 and 84 are incorporated into the pouch and after cutting and sealing as described herein, are disposed between and anchored to the inner surfaces of the first and second side panels and panel section of each package, such that the interlocking surface of each of strips 54 and 84 faces the inner surface of the panel section.

Alternatively, first and/or second interlocking strips 54 and 84 can be installed on the lay-flat web or the panel section prior to the start of the HFFS packaging process. This can be accomplished off-site from the processor, e.g. by the supplier of the web roll 41.

As shown in the embodiment of FIG. 8 (see also FIG. 10), interlocking strips 54 and 84 (not shown) are attached or anchored to a panel section 6, forming an interlocking assembly 4 unwound from roll 53 and anchored to web 41 before, or as, web 41 is wrapped about forming tube 44. Strips 54 and 84 are oriented such that their respective interlocking surfaces 252 face panel section 6 of interlocking assembly 4.

Pouches 49 and 50, and subsequent pouches, each comprise a first and second side panel, and a panel section, and in each pouch, strip 54 is anchored to the inner surface of the first side panel, and strip 84 is anchored to the inner surface of the second side panel. Strips 54 and 84 are thus trapped between the inner surfaces of the panel section and first and second side panel, arranged so that the interlocking surfaces of each of strips 54 and 84 face the inner surface of the first side panel.

Alternatively in FIG. 9 (see also FIG. 11), strips 54 and 84 are already installed on a panel section, forming an interlocking assembly 4, in turn anchored to the lay-flat web 41 prior to the start of the VFFS packaging process. This can be accomplished off-site from the processor, e.g. by the supplier of the feed roll 51. Strips 54 and 84 are disposed on the web 41 typically parallel to the first and second longitudinal edge 61 and 62 of web 41.

In some embodiments, at least one of the web, panel section and interlocking strips carries a registration device.

Figure 10:
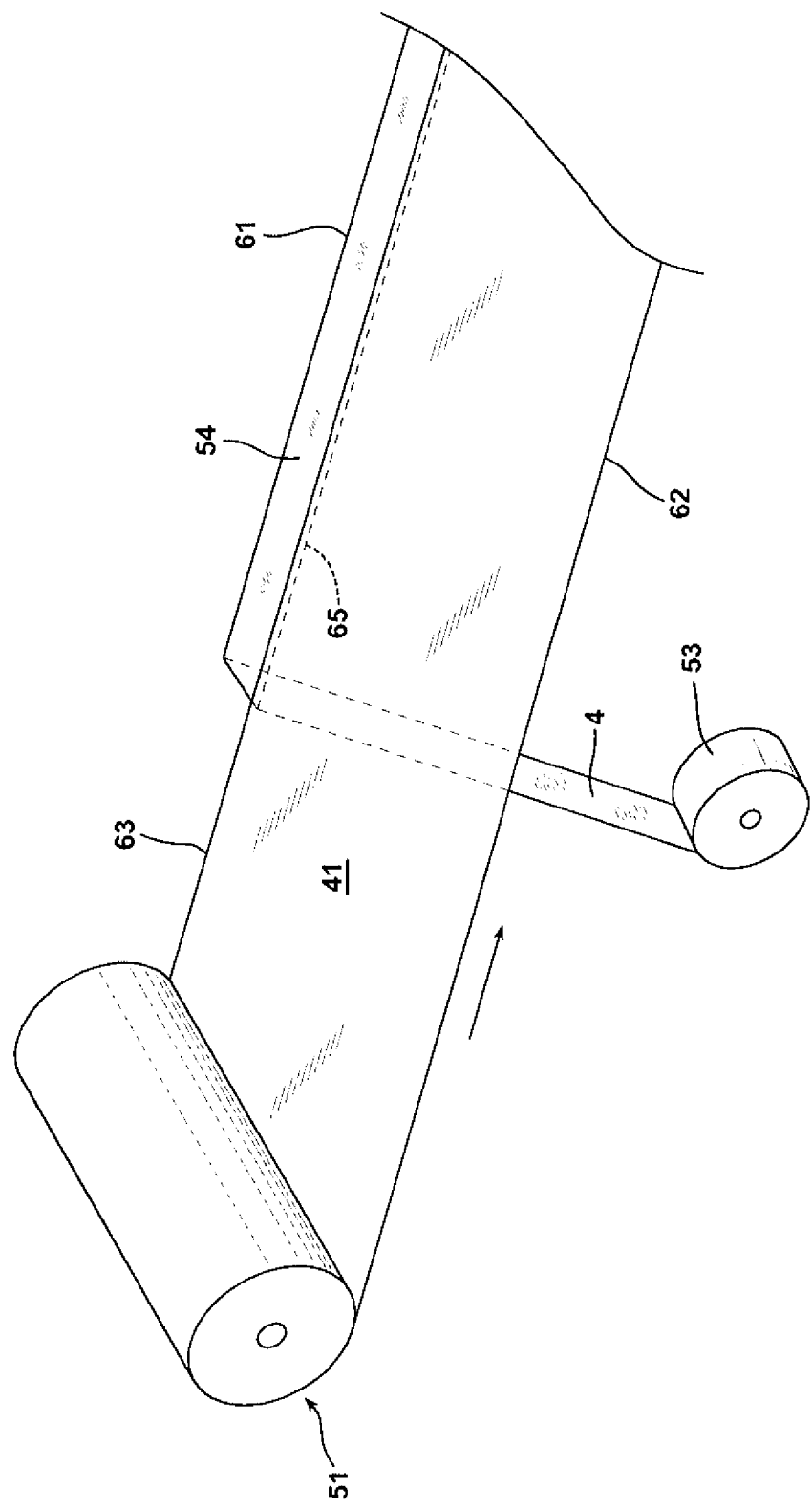
FIG. 10 is a perspective view of a roll of lay-flat film and an interlocking assembly.
Figure 11:
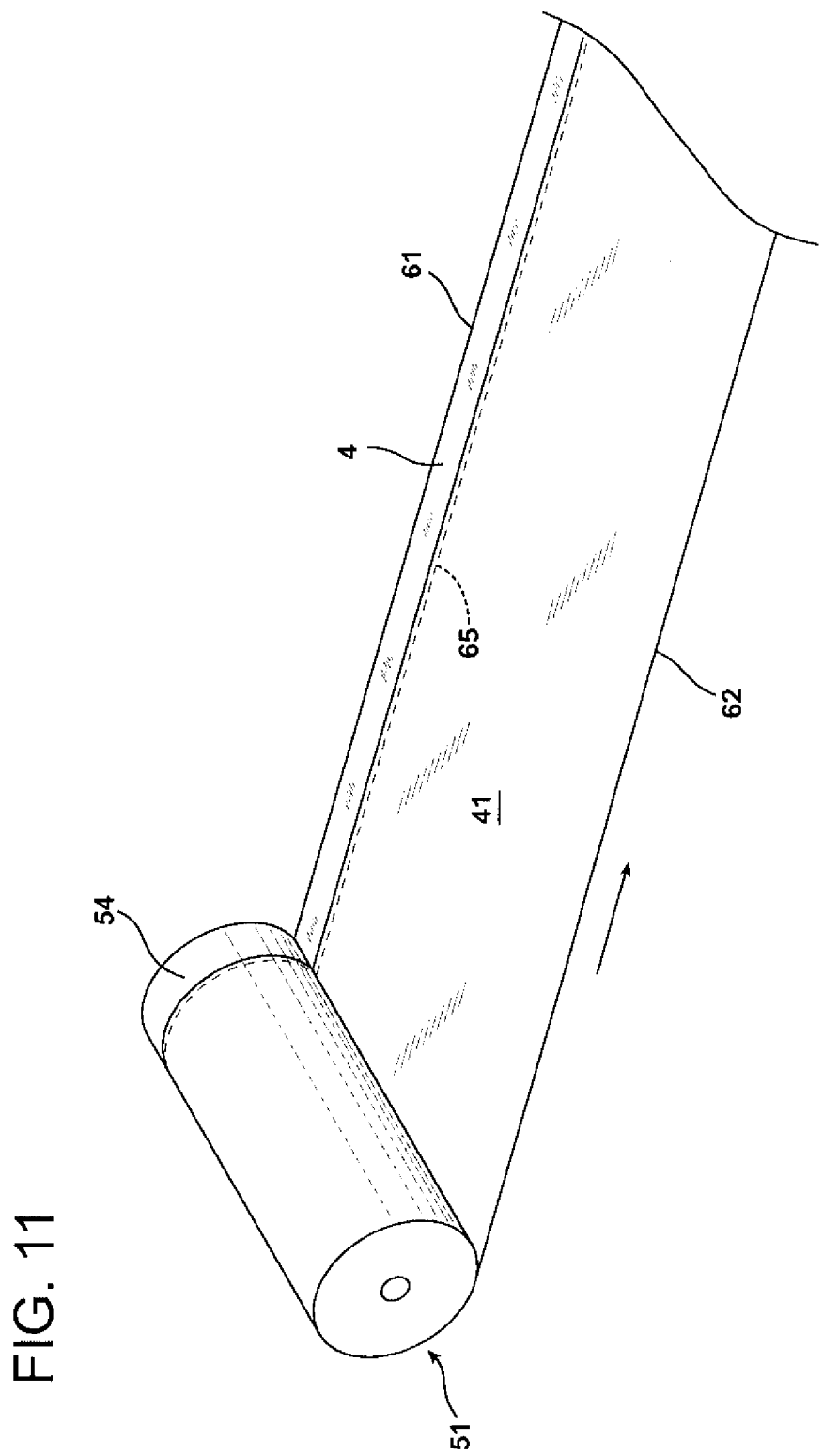
FIG. 11 is a perspective view of a roll of lay-flat film and an interlocking assembly according to another embodiment.
Figure 12:
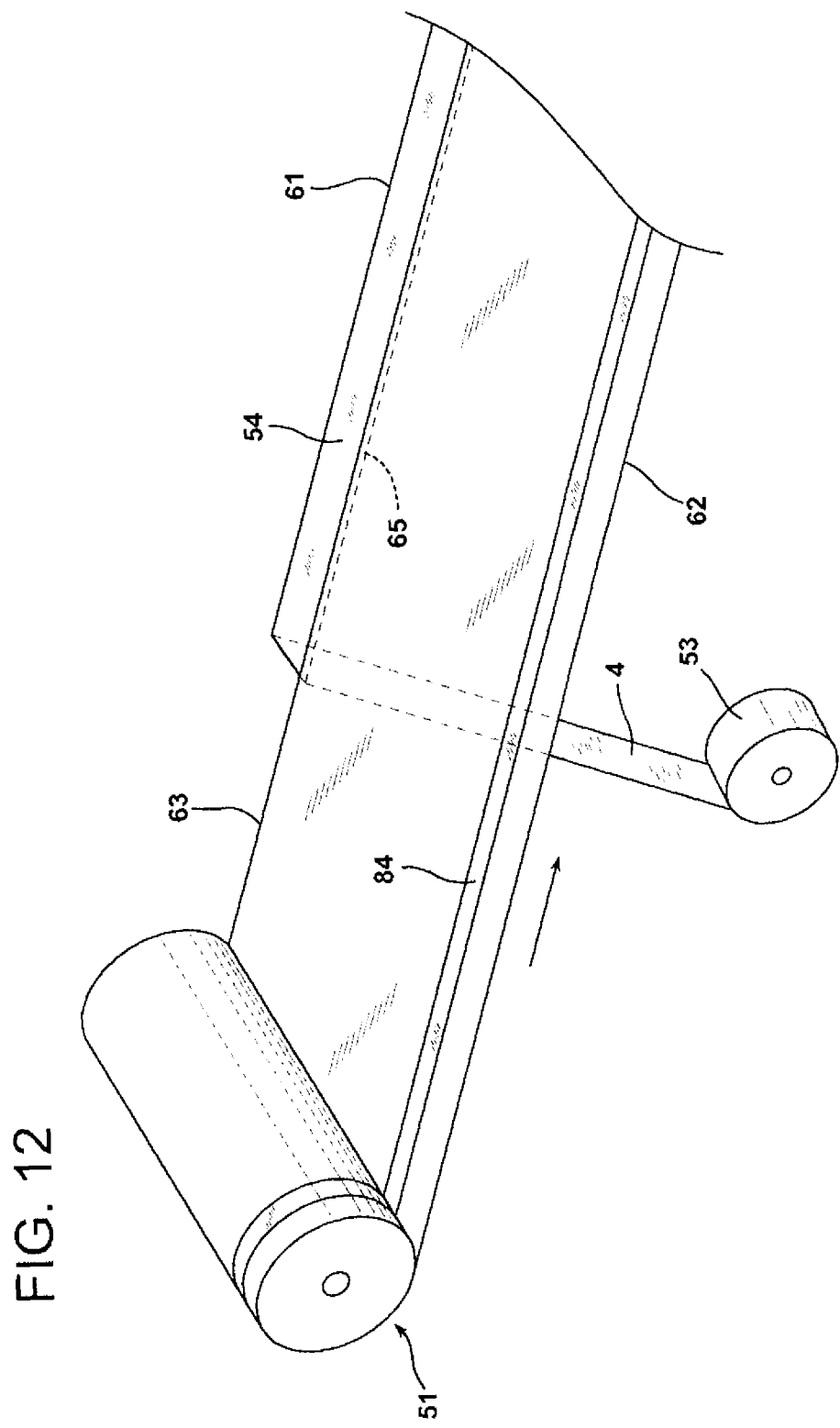
FIG. 12 is a perspective view of a roll of lay-flat film and an interlocking assembly, and an interlocking strip according to another embodiment.

FIG. 12 shows an alternative embodiment similar to the embodiment of FIGS. 10 and 11, but in which interlocking assembly 4 carries only interlocking strip 54, and interlocking strip 84 has been already anchored on the lay-flat web 41 prior to the start of the VFFS packaging process.

Figure 13:
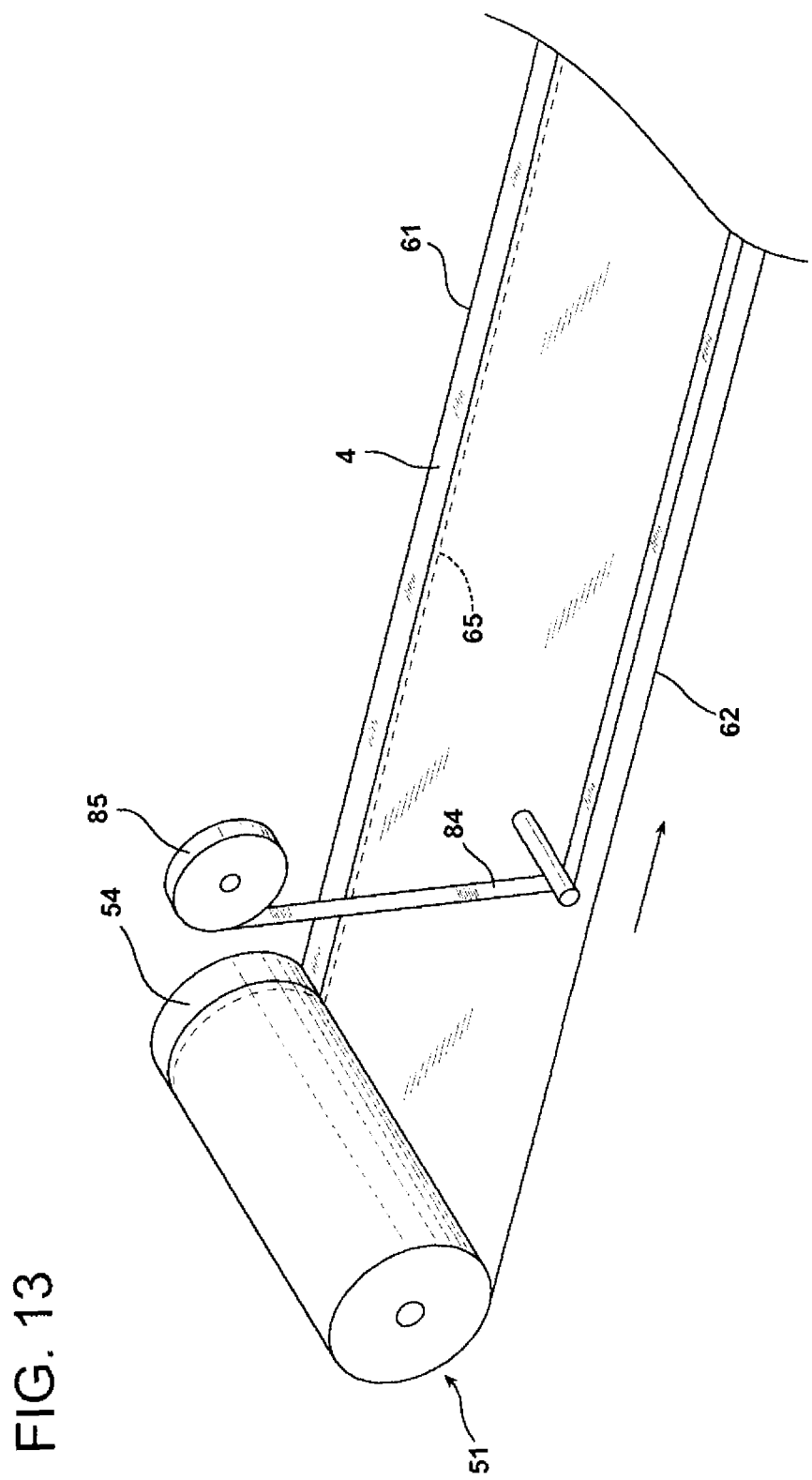
FIG. 13 is a perspective view of a roll of lay-flat film and an interlocking assembly, and an interlocking strip according to yet another embodiment.

FIG. 13 shows an alternative embodiment in which interlocking assembly 4, carrying only interlocking strip 54, has been already anchored on the lay-flat web 41 prior to the start of the VFFS packaging process; and in which interlocking strip 84 is unwound from roll 85 and anchored to web 41 before, or as, web 41 is wrapped about forming tube 44.

Figure 14:
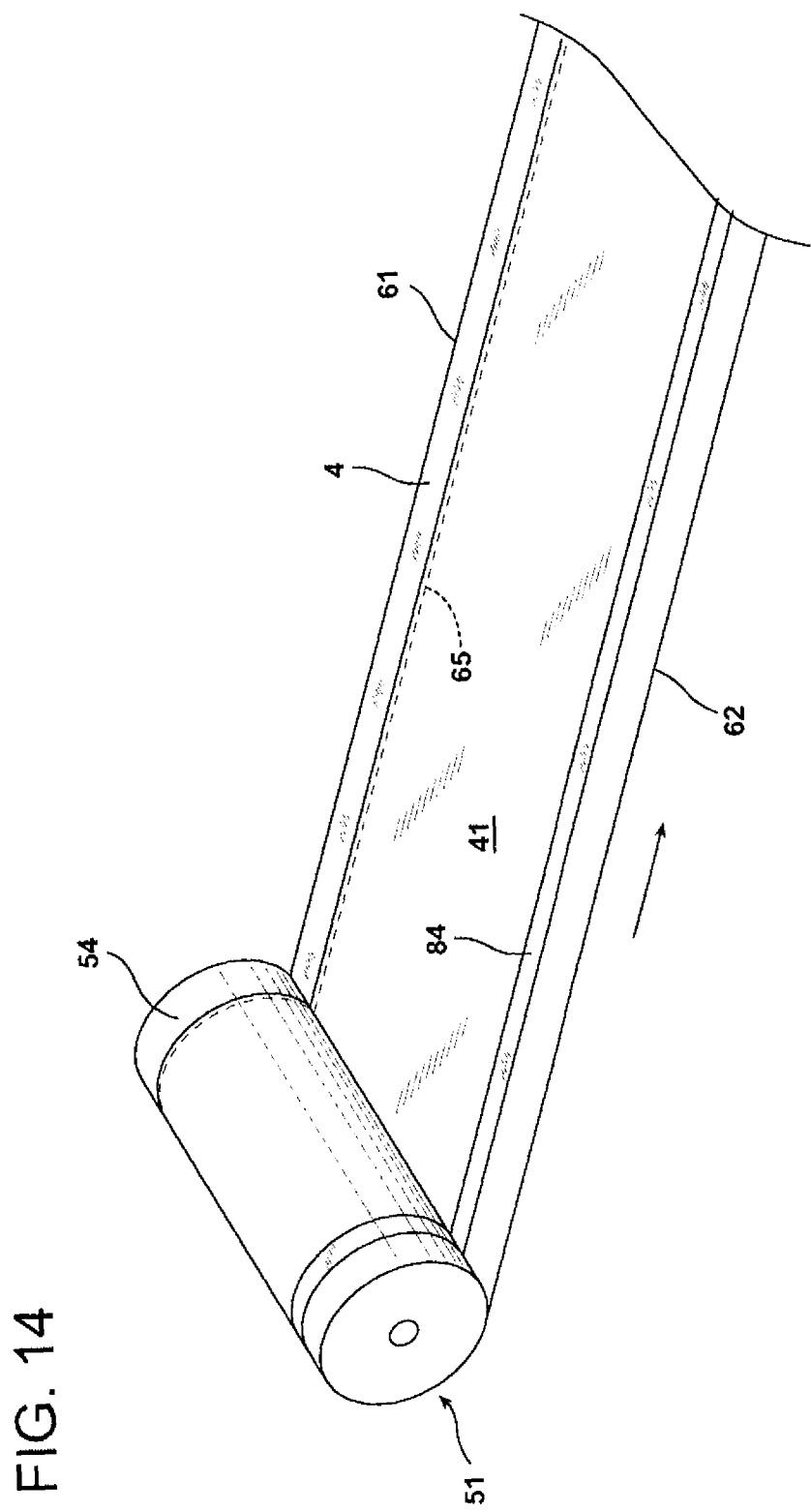
FIG. 14 is a perspective view of a roll of lay-flat film and an interlocking assembly, and an interlocking strip according to still another embodiment.

FIG. 14 shows an alternative embodiment in which both interlocking assembly 4, carrying only interlocking strip 54, and interlocking strip 84, have been already anchored on the lay-flat web 41 prior to the start of the VFFS packaging process.

Figure 15:
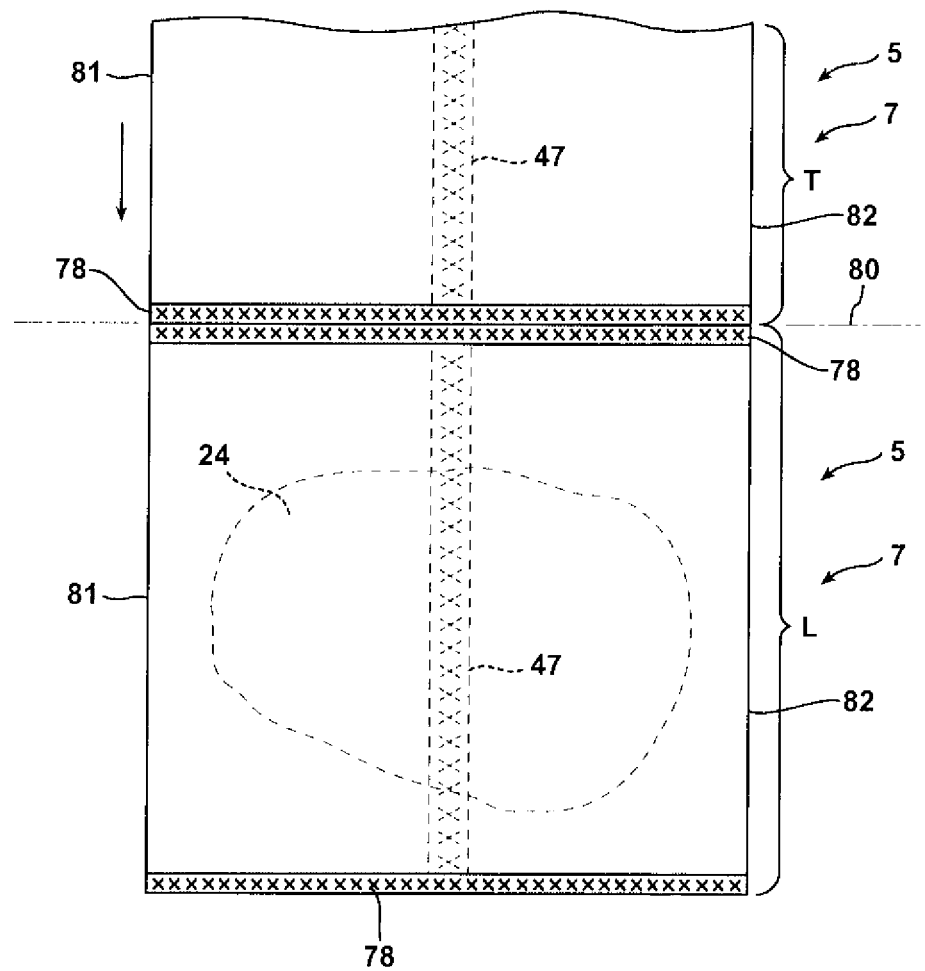
FIG. 15 is an elevational view of two consecutive pouches in a VFFS embodiment.

In FIG. 15, a leading or downstream VFFS pouch "L" includes transverse bottom and top seals 78, folded side edges 81 and 82, strips 74 and 75, and longitudinal seal 47. Trailing or upstream pouch "T" has features similar to leading pouch "L". Panel section 6 and interlocking strips 54 and 84 are present but not shown. Leading pouch "L" is severed from upstream pouch "T" at cut line 80, and the seals 78 are made by suitable sealing equipment, such as heat sealing equipment.

Figure 16:
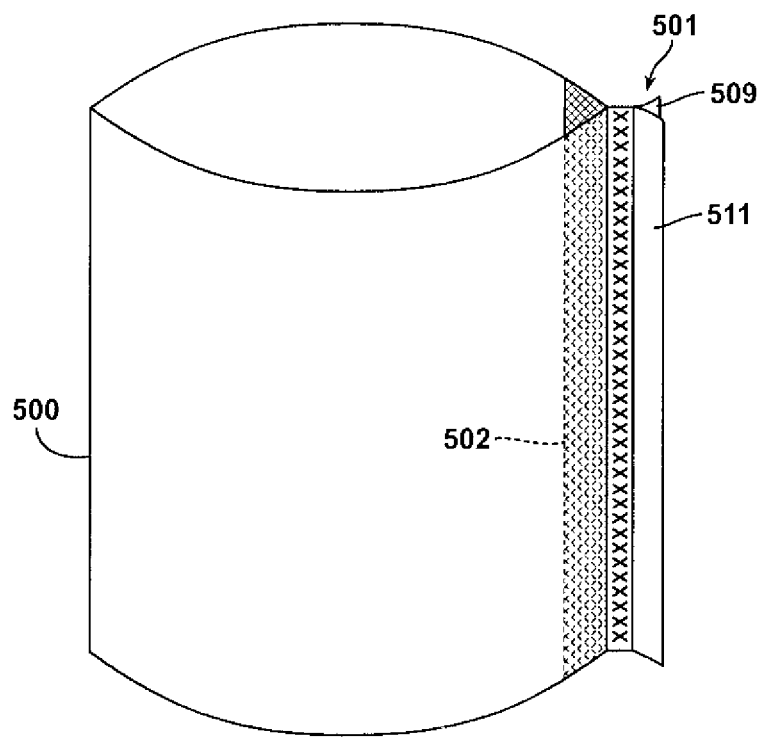
FIG. 16 is a perspective view of a folded web for use in the invention.

FIG. 16 shows folded web 500 in which panel section 502 is sealed to a longitudinal portion of the folded web, and is positioned near and spaced apart from fin seal 501, formed as disclosed hereinabove. A first interlocking strip (not shown) is anchored to panel section 502. A second interlocking strip (not shown), comparable to strip 84 of FIG. 12, is disposed in the fin seal area of the package. A finished package will thus look like the package of FIG. 3, when viewed at a right angles to the position in FIG. 3, i.e. with the interlocking strips to the right side of each package, and first ends 509, 511 of the fin seals and package, and the second end 34 representing a fold. The embodiment of FIG. 16 provides a method of producing packages on a VFFS apparatus where the longitudinal seal of the package effectively becomes the first end of the finished package (discounting any unsealed material between the longitudinal seal and the top edge of the package).

At any time during the method of making the package in an HFFS or VFFS process, strips 310 and 313, 54 and 84, or comparable pairs of strips, are anchored to the lay-flat web, the folded web, the panel section, or the inner surface of the first side panel. This can prior to or as the lay-flat web or panel section is advanced to a forming device, or before or after a product is put in the open pouch.

C. Lidstock/Formed Web

Figure 17:
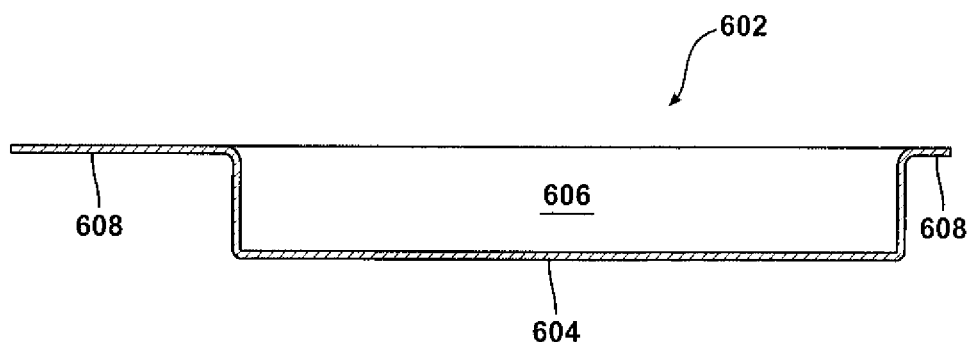
FIG. 17 is a side view of a tray for use in connection with the invention.
Figure 18:
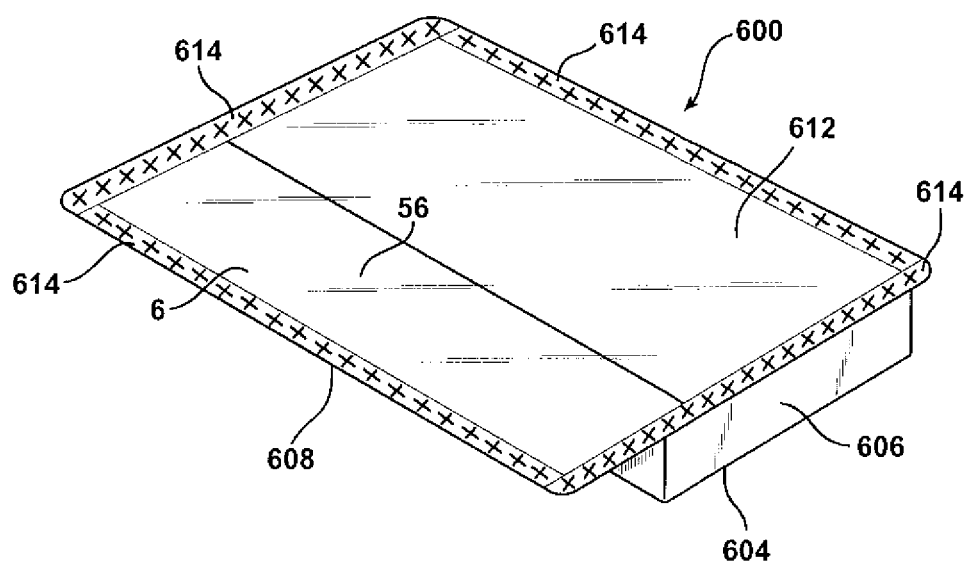
FIG. 18 is a perspective view of a package.
Figure 19:
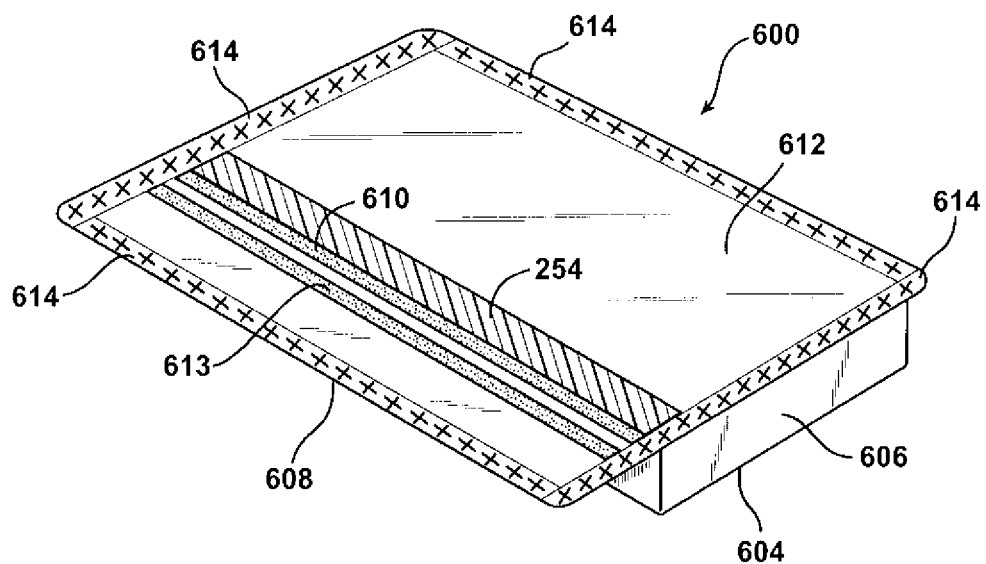
FIG. 19 is a perspective view of the package of FIG. 18 in an opened condition.

FIGS. 17 to 19 show a formed web, e.g. a tray, and a non-formed web, e.g. a lidstock, in another embodiment of the invention. Tray 602 will typically be made during the packaging process. Thermoforming equipment, available from e.g. Multivac, Tiromat, Ulma or Rapid Pak, is used to convert flat thermoplastic forming web into formed pockets to create trays for containing product such as food, various industrial and consumer items and sterile medical products, Trays are formed from a lower web by heat and pressure, loaded with product manually or automatically, optionally vacuumized or backflushed with modified atmosphere, hermetically sealed to an upper web, separated, and removed for distribution or storage. Alternatively, pre-made trays can be used, that can be rigid or semi-rigid, flat or shaped, and made from any suitable material, solid or expanded, including PP, polystyrene, polyamide, 1,4-polymethylpentene (e.g. TPX™ available from Mitsui), or crystallized polyethylene terephthalate (CPET). A tray liner can optionally be used that adheres to the surface of the pre-made tray on which the product is to be placed. This liner can be of any suitable design, and can be a multi-layer structure with at least one layer with gas-barrier properties. Such a liner can be adhered to the tray by heat lamination, extrusion lamination, extrusion coating, adhesives, corona treatment, etc. Tray 602 can be a flexible or semi-rigid, or rigid formed web.

Tray 602 has a tray bottom 604, tray sides 606, and a tray flange 608 along its perimeter to which the lidstock 612 can be sealed by heat or other means. Tray bottom 604 and tray sides 606 define a tray cavity. Tray 602 can be of any suitable thickness, e.g. from 2 to 30 mils thick, and any suitable construction.

Referring to FIGS. 18 and 19, a package includes tray 602 to which lidstock 612 has been sealed with perimeter seal 614. Lidstock 612 includes a lay-flat web formulated to function as a lid on a formed web, and can be any suitable monolayer or multilayer thermoplastic film, e.g. as described herein with respect to webs useful with the present invention. Lidstock 612 also includes panel section 6. The package includes interlocking strips 610 and 613, equivalent to strips 10 and 13 respectively, disposed between the lidstock and the tray flange such that the strips are trapped between and sealed to the lidstock and tray flange.

Strip 610 is disposed on the inside surface of the lidstock, anchored to the inside surface of the lidstock, and oriented such that its interlocking surface 252 (see FIG. 4) faces the inside surface of the lidstock. Strip 613 is disposed on the inside (upper) surface of tray flange 608, near the first end of the package, and closer to the first end of the package than strip 610, and anchored to the inside (upper) surface of tray flange 608, oriented such that its interlocking surface 252 faces the inside surface of the lidstock.

To open the package, panel section 6 is displaced by grasping an edge of the panel section and displacing it, thus providing access to the contents of the package through the area between strips 610 and 613, which are exposed by displacing the panel section. Package 600 is thus easily opened and product can be removed as desired. The package can thereafter be reclosed by folding the package such that interlocking strip 613 comes into interlocking engagement with interlocking strip 610.

Lidstock 612 can be sealed and cut, e.g. perimeter heat sealed and cut, in registered fashion by otherwise conventional means, e.g. in thermoforming equipment, as the lidstock 612 is advanced from a roll into a packaging system where it is progressively fed over filled trays, sealed to the trays, and cut to create finished packages.

Strip 610 can be anchored to lidstock 612 by the supplier of the lidstock, as in the embodiments of FIGS. 9 and 11. Alternatively, strip 610 can be anchored to the lidstock at any time during the packaging process, as in the embodiments of FIGS. 8 and 10; e.g. before or after a product is placed in the formed web, or prior to or as the lidstock is sealed to the formed web.

Strip 613 can be anchored to a web to be made into the formed web by the supplier of the web, as in the embodiments of FIGS. 9 and 11. Alternatively, strip 613 can be anchored to the inside (upper) tray flange during the packaging process, as in the embodiments of FIGS. 8 and 10; e.g. before or after a product is placed in the formed web, or prior to or as the lidstock is sealed to the formed web.

As strips 610 and 613 are disposed respectively on a lidstock, or a web to be formed into a formed web, they can be brought into contact with, and optionally tacked or anchored to a surface of the relevant web as in the HFFS and VFFS embodiments disclosed herein.

D. Continuous Horizontal Packaging

Figure 21:
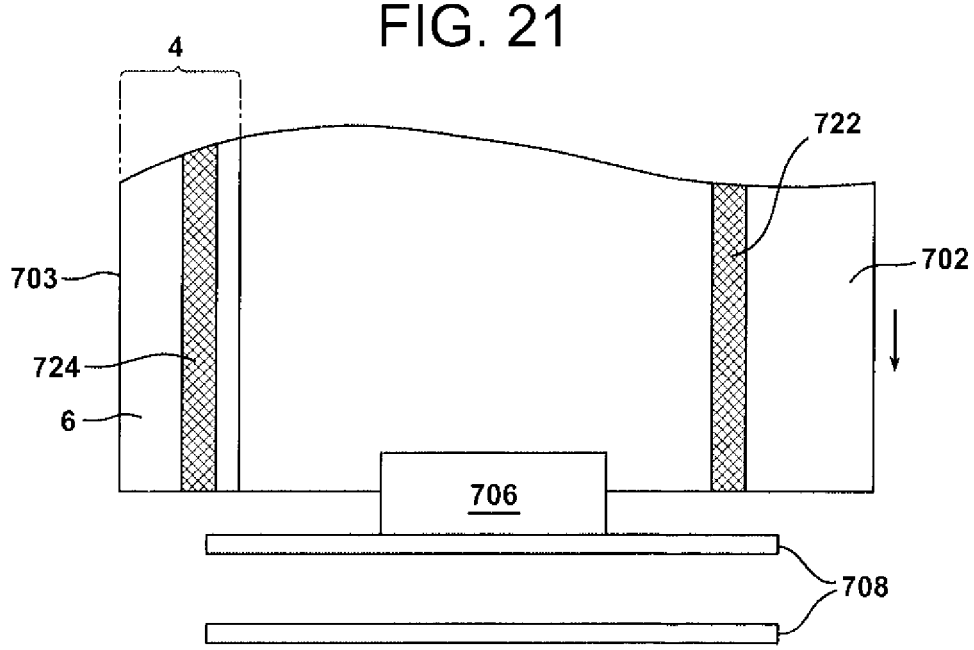
FIG. 21 is a front end view of the apparatus of FIG. 20, viewed along lines 21-21 of FIG. 20.

In another embodiment, and referring to FIGS. 20 and 21, the package of the invention can be made using a continuous HFFS process and apparatus such as those used for packaging bakery and other goods, sometimes known as Flow Wrap, Flow-Wrap or Flow wrapping machines or systems, and available from manufacturers/suppliers such as Ilapak, ULMA, and Bosch.

FIG. 20 shows such a process and apparatus 700, but one in which interlocking assembly 721, including interlocking strip 722 and panel section 6 (not shown) is installed into a package. Lay-flat web 702 is drawn from roll 704 and advanced to forming device 710. As this occurs, a series of products 706 is advanced along conveyor 708 to forming device 710, and interlocking strip 722, carried on panel section 6 to comprise interlocking assembly 721, is drawn from roll 726 and advanced to forming device 710. Web 702 is formed by forming device 710 into folded web 712. This folded web is like the folded web described above with respect to VFFS embodiments, but in a substantially horizontal orientation. Folded web 712 wraps around products 706. A longitudinal sealing device that can be part of forming device 710 forms a lap or fin seal at the bottom or top of, or along or near a side of, the folded web. The lap or fin seal is typically a heat seal. An alternative is to have a separate sealing device 714 to produce the lap or fin seal. The products travel downstream from forming device 710 and sealing device 714 to transverse sealing device 716 where the folded web is transversely sealed in areas of the folded web between adjacent products. Such seals are typically heat seals. The products are advanced from transverse sealing device 716 to cutting device 718a and 718b, where the formed and longitudinally and transversely sealed folded web is severed in areas of the folded web between adjacent products, in or near the transverse seals, such that individual packages 720 are produced. Alternatively, the sealing function of transverse sealing device 716 and the cutting function of cutting device 718a and 718b can be combined at a single station.

Web 702, panel section 6, and interlocking strip 722 can be of any suitable dimension and composition, such as those disclosed herein. As strip 722 is fed to forming device 710, it can be brought into contact with, and optionally tacked or anchored to a surface of web 702, as in the HFFS and VFFS embodiments disclosed herein. FIG. 20 shows strip 722 anchored parallel to and near longitudinal edge 703 of web 702 as they progress toward forming device 710. Alternatively, strip 722 can be fed into forming device 710, and then incorporated into folded web 712 by anchoring the strip to the interior surface of the web adjacent to the area of the formed web in which the lap or fin seal is made. In another embodiment, strip 722 can be pre-applied to a panel section in the form of interlocking assembly 721, and then anchored to web 702 by the supplier of the web, analogous to the embodiments of FIGS. 9 and 11. Another interlocking strip 724 (FIG. 21) can be installed on the web in any of the same ways as interlocking strip 722. The resulting package has a first interlocking strip 722 and a second interlocking strip 724, where both strips can be anchored to the lay-flat web or the formed web at any time during the method of making the package, such as prior to supplying the web to the processor, prior to or as the lay-flat web is advanced to a forming device, or before or after advancing a product to the forming device. Strip 722 is oriented such that its interlocking surface 252 faces panel section 6. Strip 724 is oriented such that its base surface 251 faces web 702. The strips are arranged in a finished package such that the strips are trapped between inner surfaces of web 702 and panel section 6, and are not exposed to the exterior of the package before initial opening of the package.

E. Side Seal Bags

Figure 26:
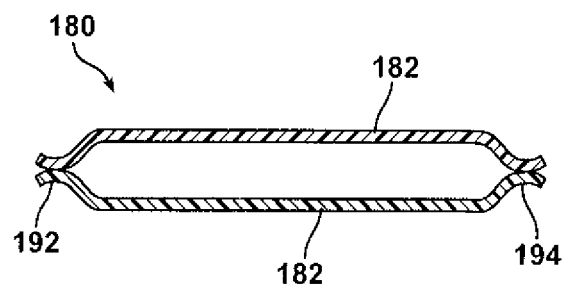
FIG. 26 is a cross sectional view of FIG. 25, viewed along lines 26-26 of FIG. 25.

In one embodiment (FIGS. 26 and 27) the package of the invention can be made using otherwise conventional bag making equipment and processes. Bags are often made as side seal bags. The side seal bag has a factory-made heat seal at opposite bag edges. The bag bottom is formed by one of two folds of film created during the extrusion of bag tubing during manufacture. The opposite fold of film is slit to form a bag mouth. The bag is typically made from a long length of bag tubing. A method of making side seal bags is disclosed in US 2008/0138478 A1 (Ebner et al.), this patent incorporated herein by reference in its entirety.

Side seal bag 180 includes web 182, first edge 184 defining an open mouth, edge fold 190, first side seal 192, and second side seal 194. Interlocking strips 189 and 191 are anchored on a bag, or on a slit bag tubing that is then cut and sealed at predetermined intervals to make a series of side seal bags 180, by any suitable process such as any of those disclosed herein. Each bag includes a first side panel and a second side panel, panel section 6, and interlocking strips 189 and 191 trapped between the first and second side panels and panel section of the bag. Both strip 189 and strip 191 are oriented such that their respective interlocking surfaces 252 face the inner surface of the panel section. Strip 189 is anchored to the inner surface of the first side panel and panel section, and strip 191 is anchored to the inner surface of the second side panel. Strips 189 and 191 can be brought into contact with, and optionally tacked or anchored to a relevant surface of the bag tubing, slit bag tubing, panel section or bag at any suitable time during the manufacture of the bag.

A bag with a panel section and interlocking strips disposed thereon can be made by extruding a thermoplastic tube to make a bag tubing; slitting the tubing at one longitudinal edge thereof; anchoring the panel section as described herein to the slit bag tubing; and periodically transversely cutting and sealing the bag tubing and panel section to make a plurality of individual bags each with two interlocking strips disposed thereon. Strips 189 and 191 can function as described herein for other embodiments and processes, in providing an easy-open and reclosable package. In some embodiments, an interlocking assembly including one or both to the interlocking strips can be fed to and anchored to the bag tubing during the bag making process; in other embodiments, a panel section, and a first and second interlocking strip can be separately fed to and anchored to a bag tubing. Some of the steps set out in US 2008/0138478 A1, for making a bag, are optional with respect to the present invention; e.g. irradiation and orientation of the tubing.

Method of Operation

In opening a package in accordance with the invention, (FIGS. 22A to 22C), panel section 6 is manually grasped and pulled away from the package, breaking through any easy-open seal that is present. This opens the package in one step. This provides access to the product in the interior 57 of the package. During this opening sequence, the anchor in region "B" between e.g. surface 254 of strip 10, and 27 of first side panel 12 (see FIG. 2), will typically remain intact, such that strip 10 stays attached to surface 27.

To reclose the package, a portion of the second side panel can be folded over, e.g. at fold region $F_L$, (FIG. 22C) such that interlocking surface 252 of interlocking strip 13 comes into interlocking engagement with interlocking surface 252 of interlocking strip 10.

The package can thereafter be reopened and reclosed repeatedly by separating the interlocking strips to access the package contents, and thereafter reengaging the interlocking strips to reclose the package.

The application of interlocking strips, and a panel section, and the assembling of a package incorporated a panel section, web, and the interlocking strips, can be done at a single location, or at separate locations, with the assembling of the package by a packager using pre-provided interlocking strips and a panel section prepared elsewhere and provided in advance of the packaging process.

The panel section 6, with interlocking strip 10, can be anchored to the first side panel of a web, pouch, or package in a number of different configurations. An example is that shown in FIG. 2. Alternatives are shown in FIGS. 23 and 24.

FIG. 23 shows the panel section with attached strip 10 anchored to the first side panel 12 by anchoring a second part of the inner surface 67 of panel section 6 to the outer surface 59 of first side panel 12.

FIG. 24 shows the panel section with attached strip anchored to the first side panel 12 by anchoring a skirt of strip 10 to the inner surface 27 of first side panel 12. A space 113 defines the juxtaposition of the second end of panel section 6 and the first end of first side panel 12.

For each of these alternatives. In the event that the anchor is in the form of a seal, appropriate sealants should be present at surfaces to be anchored by sealing.

Method of Application of the Panel Section to a Web

The panel section can be applied to a web such as a lay-flat web in a number of ways.

In one embodiment, one or both interlocking strips can be attached to a panel section, i.e. an interlocking assembly can be assembled, either at the package facility where it will be used to make packages, or at a supplier or converter location. The interlocking assembly can then be adhered or anchored to a web as disclosed herein. In another embodiment, the panel section and interlocking strips are not brought together initially, and the panel section is sealed to one surface of a web, and the strips are separately or sequentially anchored to the panel section or the web. Attachment of the panel section and strips to the web can be done simultaneously or sequentially.

PACKAGE EXAMPLES

Example 1

A package is made in accordance with the embodiment illustrated in FIG. 2 and described herein, in a horizontal form/fill/seal system. First and second side panels 12 and 14 respectively each comprise T7225B, and panel section 6 comprises H5230BZ.

T7225B™ film has the construction EAO/EAO/LLDPE tie/nylon/EVOH/nylon/EVA tie/EVA tie/nylon. The first layer of EAO typically acts as the heat sealant layer of the film, and in packaging made from the laminate, the EAO will form the inner or sealant surface of the package, facing the contained product, and the nylon of the last layer will form the outer or skin surface of the package.

H5230BZ is a laminate having the construction:

| chemically treated PET | polyurethane adhesive | coextruded barrier film |
|---|---|---| where the PET (PET1) is a biaxially oriented polyester film, and the coextruded barrier film has the construction:

| Layer 1 | Layer 2 | Layer 3 | Layer 4 | Layer 5 | Layer 6 | Layer 7 | Layer 8 |
|---|---|---|---|---|---|---|---|
| EZ1 | AD1 | 80% NY1 + 20% NY2 | OB1 | 80% NY1 + 20% NY2 | AD1 | PE1 | PE1 |
| 0.63 | 0.19 | 0.19 | 0.25 | 0.19 | 0.19 | 0.44 | 0.44 |

The overall thickness of the coextruded barrier film is about 2.50 mils. Layer gauges in mils for each layer are indicated below each layer. Layer 8 is the layer of the barrier film adhered, by the polyurethane adhesive, to the PET film. Layer 1 is the easy-open heat sealant layer of the film, and provides the inner or sealant surface of the panel section, facing the interior of the package, and the PET forms the outer surface of the panel section. The thickness of the PET film is about 0.48 mils, and the thickness of the polyurethane adhesive is about 0.20 mils. The overall thickness of the laminate is about 3.18 mils.

The above resins are identified in Table 1.

TABLE 1

| Material Code | Tradename Or Designation | Source(s) |
|---|---|---|
| AD1 | PLEXAR ™ PX1007 ™ | Equistar |
| EZ1 | APPEEL ™ 72D727 | DuPont |
| NY1 | ULTRAMID ™ B33 01 | BASF |
| NY2 | GRIVORY ™ G21 | EMS |
| OB1 | SOARNOL ™ ET3803 | Nippon Gohsei |
| PE1 | PETROTHENE ™ NA 345-013 ™ | LyondellBasell |
| PET1 | MYLAR ™ 822 ™ | DuPont Teijin |

AD1 is a maleic anhydride modified EVA that acts as a polymeric adhesive (tie layer material).
EZ1 is a compound polymer blend of 65% ionomer (SURLYN ™ 1650SB), 30% EVA (ELVAX ™ 3134Q), and 5% polybutylene (MONTELL ™ PB8640), each by weight of the blend.
NY1 is nylon 6 (polycaprolactam).
NY2 is an amorphous copolyamide (6I/6T) derived from hexamethylene diamine, isophthalic acid, and terephthalic acid.
OB1 is EVOH with about 38 mole % ethylene.
PE1 is LDPE.
PET1 is a chemically treated biaxially oriented polyester.
All percentages herein are by weight unless indicated otherwise.

Before the package is made, strips 10 and 13 are anchored to the panel section comprising H5230BZ (specifically, to layer 1 of the coextruded barrier film of the H5230BZ laminate) while the latter is in a lay-flat condition, and the resulting interlocking assembly is then anchored to the web making up the first and second side panel (in this example, T7225B), and specifically anchored to a portion of the web that will constitute the first side panel; the interlocking assembly positioned so as to result in the package as shown in FIG. 2.

Example 2

A package like that of package example 1 is made, but in which the panel section comprises the eight layer material identified in Table 1, Example 1, having an easy-open sealant layer comprising EZ1.

The above descriptions are those of embodiments of the invention. All parts and percentages are by weight, unless otherwise indicated or well understood in the art. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests are to the most recent, currently approved, and published version of the ASTM test identified, as of the priority filing date of this application. Each such published ASTM test method is incorporated herein in its entirety by reference.

Terms referring to polymers, such as polyester, polyamide, and polyolefin, refer herein to both homopolymers and copolymers thereof, unless otherwise specified.

In the drawings, the flow of materials is in the direction of the arrows.

The drawings herein are not necessarily to scale, and certain features of the invention may be graphically exaggerated for clarity.

Both the web or webs used in the manufacture of the package according to the invention, the panel section, and the interlocking strips, can be made by any suitable process, including coextrusion, extrusion coating, extrusion lamination, and conventional lamination using polyurethane or other adhesives. Extrusion can be done in annular or flat dies. The extrudate can be hot blown or cast, and optionally solid-state oriented as desired. Chemical or electronic crosslinking of one or more layers of the webs can be done. Both web and strips can be advanced by suitable motive means (not shown, and well known in the art, such as a motor) from their respective rolls.

A package according to the invention can optionally carry printed indicia, which can be decorative or informational in nature. Decorative printed indicia can include a logo, a trademark, product information, etc. with text and/or graphics. Printed indicia can be in the form of a message e.g. "easy open" or "open here". This can be printed in scattered process (i.e. registration is not required) on or near the first end of the package, and surface printed or reverse printed.

In some embodiments, it may be beneficial to adhere the strips to the lay-flat web or panel section prior to processing on equipment, or at the time, before processing, when the strips are disposed on the web or panel section. Any suitable means, such as pressure sensitive adhesive or permanent adhesive, or heat sealing or other types of sealing, can be used to attach or seal the strips to the web or panel section to ensure that the strips maintain their position on the web or panel section during processing. In some embodiments, the strips are anchored to the web or panel section at the interface between the web or panel section and the surface of the strips comprising a sealant layer that provides a relatively strong seal. The strips can be e.g. sealed to the web or panel section by a suitable device (not shown) such as a heat sealer, disposed below the web or panel section while the web or panel section is in its lay-flat condition. In such embodiments, the surface of the strips that comprises an easy-open surface, if present, faces away from the web or panel section, so that the opposite surface of the strips is sealed to the web or panel section. This approach leaves the easy-open surface, if any, unaffected until such time as the package is made and closed, or until e.g. the lap or fin seal is made on the pouch.

In the embodiments disclosed herein, the first end of the package can be sealed, typically where two webs are used to make the package. Alternatively, the first end of the package can be a fold, e.g. where a single web of material is used to make the package.

Although the invention is described in some embodiments herein as a package comprising a pouch comprising a first and second side panel each having a top edge, a first side edge, and a second side edge, those skilled in the art will understand, after a review of this disclosure, that in some embodiments, wherein a single web is used, the terms "side panel", "top edge", "first side edge", "second side edge", and the like are used for convenience to describe the relative locations or regions on a single web made into a pouch, so that the overall geometry of the package, and relative positions of the various features of the invention can be described. Thus, for instance, the first and second panels in a single web embodiment of the invention can be simply defined regions of the pouch, and the package made therefrom, and side edges are simply the side lines of those regions. In such embodiments, the line of joinder of the side edges are the two side folds in the web that define the sides of the package. In contrast, in embodiments with two webs, each web when produced will have an identifiable first and second side edge, that will each be joined to a respective side edge of a second web.

Those skilled in the art will appreciate that in describing a panel, strip or the like being "sealed" to another panel, strip, or the like, sealing is done by conventional means as described, and typically occurs in seal widths consistent with industry practice for packaging.

Packages of the various embodiments of the invention disclosed herein can optionally be vacuumized or gas flushed by otherwise conventional means. A package in accordance with the invention can contain a modified atmosphere.

For the avoidance of doubt, the present application is directed in various embodiments to the subject matter described in the following paragraphs. These are optional embodiments of any of the first, second, third, or any subsequent aspects of the invention as described hereinabove in the Summary of the Invention, and for each aspect these features can be taken alone or in any suitable combination of these features:

at least one of the first and second interlocking strips comprises a skirt segment having a first and second surface, a first and second side edge, and a first and second end.

at least one of the first and second surfaces of the skirt segment of the first and/or second interlocking strip comprises a relatively strong sealant.

at least one of the first and second surfaces of the skirt segment of the first and/or second interlocking strip comprises an easy-open sealant.

the second surface of the first skirt segment is anchored to the inner surface of the first side panel with a relatively strong seal.

the first and second side panels are joined together along their respective first and second side edges with a seal.

the first and second side panels are joined together along their respective first and second side edges with a fold.

the first end of the panel section, and the second side panel, are joined together with a seal.

the first end of the panel section, and the first end of the second side panel, are joined together with a seal.

the second end of the first side panel, and the second end of the second side panel, are joined together with a seal.

the second end of the first side panel, and the second end of the second side panel, are joined together with a fold.

the package with an easy-open supplemental seal can be opened with a peel force of from 25 grams/inch to 5 pounds/inch.

the package is absent a discrete thread or tear strip.

a supplemental easy-open seal seals the panel section to the first end of the first interlocking strip.

a supplemental easy-open seal seals the panel section to the second surface of a skirt of the second interlocking strip.

the first side edge of each of the first and second interlocking strips is disposed between and sealed to the first side edge of the panel section and second side panel respectively, and the second side edge of each of the first and second interlocking strips is disposed between and sealed to the second side edge of the panel section and second side panel respectively.

the first and second interlocking fasteners each comprise hook-and-loop fasteners.

the first and second interlocking fasteners each comprise self-interlocking fasteners.

the package can be opened in one step.

the package can be closed in one step.

the package can be produced using three reels, two reels each carrying and dispensing an interlocking strip, and a third reel carrying and dispensing a panel section, such that a greater length of interlocking strip can be carried on each reel, and the reels require change-over less often, than if two already interlocked strips were carried on a single reel.

having two separate strips results in a thinner overall material at the side seals of the pouch and package, and therefore a stronger seal and/or a seal more easily made, than when two already interlocked strips are sealed at a given location on a pouch or package.

when the panel section is displaced, the package is thereby opened.

the inner surface of the panel section comprises an easy-open sealant.

a second part of the inner surface of the panel section is anchored to the outer surface of the first side panel.

the first and second panel, and the panel section are absent a die cut that functions to open the package.

What is claimed is:

1. An easy-open and reclosable package comprising:
a) a pouch comprising
   i) a first and second side panel each comprising an outer and inner surface, a first and second side edge, and a first and second end, the first and second side panels joined together along their respective first and second side edges;
   ii) a first end;
   iii) a second end defined by the second end of the first and second side panels respectively;
   iv) a panel section comprising an outer and inner surface, a first and second side edge, and a first and second end, the inner surface comprising an easy-open sealant, wherein
      the first end of the panel section is joined to the second side panel with an easy-open seal,
      the panel section and the second side panel are joined together along their respective first and second side edges with an easy-open seal, and
      the panel section is anchored to the first side panel;

v) a reclosure mechanism, disposed between the panel section and the second side panel, comprising
  (a) a first interlocking strip comprising a first and second side edge, a first and second end, and an interlocking segment having a base surface and an interlocking surface, the first interlocking strip anchored to at least one of the panel section and first side panel such that the interlocking surface faces the inner surface of the panel section, and
  (b) a second interlocking strip comprising a first and second side edge, a first and second end, and an interlocking segment having a base surface and an interlocking surface, the second interlocking strip anchored to the inner surface of the second side panel such that the interlocking surface faces the inner surface of the panel section; and
wherein when the panel section is displaced, and the package is opened,
  (a) the product can be accessed between the first and second interlocking strips,
  (b) the interlocking surface of each of the first and second interlocking strips is at least partially exposed, and
  (c) the package can thereafter be reclosed by folding the package such that the interlocking surface of the first interlocking strip is interlocked with the interlocking surface of the second interlocking strip; and
b) a product disposed in the pouch;
wherein the package is configured such that
(i) the interlocking surfaces of the first and second interlocking strips are not exposed until the package is initially opened,
(ii) the interlocking surfaces of the first and second interlocking strips are not interlocked with one another until the package is initially opened and then reclosed, and
(iii) the interlocking surface of the first interlocking strip is farther from the first end of the package than the interlocking surface of the second interlocking strip.

2. The package of claim 1 wherein at least one of the first and second interlocking strips comprises a skirt segment having a first and second surface, a first and second side edge, and a first and second end.

3. The package of claim 2 wherein at least one of the first and second surfaces of the skirt segment of the first or second interlocking strip comprises an easy-open sealant.

4. The package of claim 1 wherein a second part of the inner surface of the panel section is anchored to the outer surface of the first side panel.

5. The package of claim 1 wherein an easy-open supplemental seal seals the panel section to the first interlocking strip.

6. The package of claim 1 wherein the first side edge of each of the first and second interlocking strips is disposed between and sealed to the first side edge of the panel section and second side panel respectively, and the second side edge of each of the first and second interlocking strips is disposed between and sealed to the second side edge of the panel section and second side panel respectively.

7. The package of claim 1 wherein the first and second interlocking fasteners each comprise self-interlocking fasteners.

8. A method of making an easy-open and reclosable package in a horizontal form/fill/seal process comprising:
  a) providing a lay-flat web comprising a first and second surface;
  b) providing a reclosure mechanism comprising a first and second interlocking strip each comprising a first and second side edge, a first and second end, and an interlocking segment having a base surface and an interlocking surface;
  c) providing a panel section comprising an outer and inner surface, a first and second side edge, and a first and second end, the inner surface comprising an easy-open sealant;
  d) advancing the lay-flat web to a forming device to convert the lay-flat web to a folded web having an interior surface;
  e) advancing the reclosure mechanism and panel section such that when the package is made, the reclosure mechanism and panel section are part of the package;
  f) making side seals in the folded web and the panel section to produce an open pouch comprising
    i) the first and second side panels each comprising an outer and inner surface, a first and second side edge, and a first and second end, the first and second side panels joined together along their respective first and second side edges by a seal,
    ii) a first end defined by the first end of at least one of the panel section and second side panel,
    iii) a second end defined by the second end of the first and second side panels respectively, the first and second side panels joined together along their respective second ends,
    iv) the panel section and second side panel joined along their respective first and second side edges with an easy-open seal, and
    v) positioning the first and second interlocking strips such that the interlocking surfaces of the first and second interlocking strips each face the inner surface of the panel section;
  g) putting a product in the open pouch; and
  h) sealing the first end of the first side panel to the second side panel to close the pouch;
wherein the package is configured such that
(i) when the panel section is displaced, and the package is opened,
  (a) the product can be accessed between the first and second interlocking strips,
  (b) the interlocking surface of each of the first and second interlocking strips is at least partially exposed, and
  (c) the package can thereafter be reclosed by folding the package such that the interlocking surface of the first interlocking strip is interlocked with the interlocking surface of the second interlocking strip;
(ii) the interlocking surfaces of the first and second interlocking strips are not exposed until the package is initially opened;
(iii) the interlocking surfaces of the first and second interlocking strips are not interlocked with one another until the package is initially opened and then reclosed;
(iv) the interlocking surface of the first interlocking strip is farther from the first end of the package than the interlocking surface of the second interlocking strip;
(v) each of the first and second interlocking strips is either pre-anchored to the lay-flat web or panel section, or is anchored to the lay-flat web, folded web, first or second side panel, or panel section at any time before or during the method of making the package; and
(vi) the web is cut at the side seals during the step of making side seals in the folded web, or before, during or after any subsequent steps.

9. The method of claim 8 wherein at least one of the first and second interlocking strips comprises a skirt segment having a first and second surface, a first and second side edge, and a first and second end.

10. The method of claim 9 wherein at least one of the first and second surfaces of the skirt segment of the first or second interlocking strip comprises an easy-open sealant.

11. The method of claim 8 wherein a second part of the inner surface of the panel section is anchored to the outer surface of the first side panel.

12. The method of claim 8 wherein an easy-open supplemental seal seals the panel section to the first interlocking strip.

13. The method of claim 8 wherein the first side edge of each of the first and second interlocking strips is disposed between and sealed to the first side edge of the panel section and second side panel respectively, and the second side edge of each of the first and second interlocking strips is disposed between and sealed to the second side edge of the panel section and second side panel respectively.

14. The method of claim 8 wherein the first and second interlocking fasteners each comprise self-interlocking fasteners.

15. A method of making an easy-open and reclosable package in a continuous horizontal packaging process comprising:
 a) providing a lay-flat web comprising a first and second surface;
 b) providing a panel section comprising an outer and inner surface, a first and second side edge, and a first and second end, the inner surface comprising an easy-open sealant,
 c) providing a reclosure mechanism comprising a first and second interlocking strip each comprising a first and second side edge, a first and second end, and an interlocking segment having a base surface and an interlocking surface;
 d) advancing the lay-flat web to a forming device to convert the lay-flat web into a folded web having an interior surface;
 e) advancing the reclosure mechanism and panel section such that when the package is made, the reclosure mechanism and panel section are part of the package;
 f) advancing a product to the forming device such that the folded web and panel section envelop the product;
 g) longitudinally sealing the folded web and panel section to make a longitudinal seal;
 h) transversely sealing the folded web and panel section, with the product therein, to produce a leading transverse seal to define a first pouch;
 i) advancing the folded web and panel section, with the leading transverse seal, forward a predetermined distance;
 j) transversely sealing the first pouch to produce a trailing transverse seal in the first pouch, and a leading transverse seal in a second pouch, the second pouch disposed upstream of the first pouch; and
 k) cutting the folded web and panel section to separate the first pouch from the second pouch to form an individual package comprising the first and second side panel, and the panel section, the package comprising
  the first and second side panels each comprising an outer and inner surface, a first and second side edge, and a first and second end, the first and second side panels joined together along their respective first and second side edges, the panel section and second side panel joined along their respective first and second side edges with an easy-open seal,
  a first end defined by the first end of at least one of the panel section and second side panel,
  a second end defined by the second end of the first and second side panels respectively, and
  the first interlocking strip anchored to at least one of the panel section and first side panel such that the interlocking surface of the first interlocking strip faces the inner surface of the panel section, and the second interlocking strip anchored to the inner surface of the second side panel such that the interlocking surface of the second interlocking strip faces the inner surface of the panel section;
 wherein the package is configured such that
 (i) when the panel section is displaced, and the package is opened,
  (a) the product can be accessed between the first and second interlocking strips,
  (b) the interlocking surfaces of each of the first and second interlocking strips is at least partially exposed, and
  (c) the package can thereafter be reclosed by folding the package such that the interlocking surface of the first interlocking strip is interlocked with the interlocking surface of the second interlocking strip;
 (ii) the interlocking surfaces of the first and second interlocking strips are not exposed until the package is initially opened;
 (iii) the interlocking surfaces of the first and second interlocking strips are not interlocked with one another until the package is initially opened and then reclosed;
 (iv) the interlocking surface of the first interlocking strip is farther from the first end of the package than the interlocking surface of the second interlocking strip; and
 (v) each of the first and second interlocking strips is either pre-anchored to the lay-flat web or panel section, or is anchored to the lay-flat web, folded web, first or second side panel, or panel section at any time before or during the method of making the package.

16. The method of claim 15 wherein at least one of the first and second interlocking strips comprises a skirt segment having a first and second surface, a first and second side edge, and a first and second end.

17. The method of claim 16 wherein at least one of the first and second surfaces of the skirt segment of the first or second interlocking strip comprises an easy-open sealant.

18. The method of claim 15 wherein a second part of the inner surface of the panel section is anchored to the outer surface of the first side panel.

19. The method of claim 15 wherein an easy-open supplemental seal seals the panel section to the first interlocking strip.

20. The method of claim 15 wherein the first side edge of each of the first and second interlocking strips is disposed between and sealed to the first side edge of the panel section and second side panels respectively, and the second side edge of each of the first and second interlocking strips is disposed between and sealed to the second side edge of the panel section and second side panels respectively.

21. The method of claim 15 wherein the first and second interlocking fasteners each comprise self-interlocking fasteners.

* * * * *